(12) United States Patent
Lesner et al.

(10) Patent No.: US 11,663,528 B2
(45) Date of Patent: May 30, 2023

(54) TRAINING AN ENSEMBLE OF MACHINE LEARNING MODELS FOR CLASSIFICATION PREDICTION USING PROBABILITIES AND ENSEMBLE CONFIDENCE

(71) Applicant: Intuit Inc., Mountain View, CA (US)

(72) Inventors: Christopher Lesner, Palo Alto, CA (US); Alexander Ran, Palo Alto, CA (US)

(73) Assignee: Intuit Inc., Mountain View, CA (US)

( * ) Notice: Subject to any disclaimer, the term of this patent is extended or adjusted under 35 U.S.C. 154(b) by 269 days.

(21) Appl. No.: 16/917,643

(22) Filed: Jun. 30, 2020

(65) Prior Publication Data
US 2021/0406780 A1    Dec. 30, 2021

(51) Int. Cl.
| | |
|---|---|
| G06N 20/00 | (2019.01) |
| G06N 20/20 | (2019.01) |
| G06V 30/242 | (2022.01) |
| G06F 18/214 | (2023.01) |
| G06F 18/20 | (2023.01) |
| G06F 18/24 | (2023.01) |
| G06N 7/01 | (2023.01) |
| G06N 5/01 | (2023.01) |

(52) U.S. Cl.
CPC .......... *G06N 20/20* (2019.01); *G06F 18/214* (2023.01); *G06F 18/24765* (2023.01); *G06F 18/285* (2023.01); *G06N 7/01* (2023.01); *G06V 30/242* (2022.01); *G06N 5/01* (2023.01)

(58) Field of Classification Search
CPC ........ G06N 20/20; G06N 7/005; G06N 5/003; G06V 30/242; G06K 9/6227; G06K 9/6256; G06K 9/626; G06K 9/6807
See application file for complete search history.

(56) References Cited

U.S. PATENT DOCUMENTS

| | | | | |
|---|---|---|---|---|
| 8,868,472 B1* | 10/2014 | Lin | ......................... | G06N 5/02 |
| | | | | 706/12 |
| 2014/0279745 A1* | 9/2014 | Esponda | ................ | G06N 5/043 |
| | | | | 706/12 |
| 2020/0134083 A1* | 4/2020 | Elliman | ................. | G06N 20/00 |
| 2021/0097400 A1* | 4/2021 | Lee | ...................... | G06N 3/0454 |

* cited by examiner

*Primary Examiner* — Pakee Fang
(74) *Attorney, Agent, or Firm* — Ferguson Braswell Fraser Kubasta PC

(57) ABSTRACT

A method including training predictor machine learning models (MLMs) using a first data set. The trained predictor MLMs are trained to predict classifications of data items in the first data set. The method also includes training confidence MLMs using second classifications, output by the trained predictor MLMs. The method also includes generating an aggregated ranked list of classes based on third classifications output by the trained predictor MLMs and second confidences output by the trained confidence MLMs. The method also includes training an ensemble confidence MLM using the aggregated ranked list of classes to generate a trained ensemble confidence MLM. The trained ensemble confidence MLM is trained to predict a corresponding selected classification for each corresponding data item in a training data set containing second data items similar to the first data items.

19 Claims, 17 Drawing Sheets

TRAINING AN ENSEMBLE OF MACHINE LEARNING MODELS FOR CLASSIFICATION PREDICTION USING PROBABILITIES AND ENSEMBLE CONFIDENCE

BACKGROUND

A machine learning model (MLM) is a computer program that has been trained to recognize certain types of patterns. Training involves establishing parameters of the MLM using a set of training data for which the output pattern is already known. Once the parameters are set, the MLM may be provided with new data for which the output pattern is not known. The output of the trained MLM operating on new data is one or more numbers that reflect a prediction of the types of patterns in the new data.

One use of a MLM is to automatically classify data items in a new data set. For example, a new data set may be billions of computer emails. A trained MLM may be used to automatically classify the billions of computer emails as either being undesirable malicious emails, undesirable junk emails, possibly desirable marketing emails, desirable personal emails, and desirable work-related emails. The undesirable junk emails may be sent to a junk email folder, and the undesirable malicious emails are blocked altogether.

A MLM may be used to perform many different classification tasks, other than email sorting. However, a MLM may produce classification results that are not accurate enough for a particular classification task.

SUMMARY

The one or more embodiments provide for a method. The method includes training predictor machine learning models (MLMs) using a first data set. The trained predictor MLMs are trained to predict classifications of data items in the first data set. The method also includes training confidence MLMs using second classifications, output by the trained predictor MLMs. The method also includes generating an aggregated ranked list of classes based on third classifications output by the trained predictor MLMs and second confidences output by the trained confidence MLMs. The method also includes training an ensemble confidence MLM using the aggregated ranked list of classes to generate a trained ensemble confidence MLM. The trained ensemble confidence MLM is trained to predict a corresponding selected classification for each corresponding data item in a training data set containing second data items similar to the first data items.

The one or more embodiments also provide for a method of machine learning training. The method includes training predictor machine learning models (MLMs) using a first data set. The trained predictor MLMs are trained to predict corresponding first classifications of first data items in the first data set. The method also includes predicting, by the trained predictor MLMs, second classifications of second data items in a second data set. The second data items in the second data set are similar to the first data items in the first data set. The first outputs of the trained predictor MLMs include first corresponding vectors of numbers that indicate first corresponding probabilities that the second data items correspond to the second classifications. The method also includes training confidence MLMs using the first corresponding vectors. The trained confidence MLMs are trained to predict first confidences represented by second probabilities that the second classifications are correct. The method also includes predicting, by the trained predictor MLMs, third classifications of third data items in a third data set. The third data items in the third data set are similar to the first data items in the first data set and the second items in the second data set. The second outputs of the trained predictor MLMs include second corresponding vectors of numbers that indicate third probabilities that the third data items correspond to the third classifications. The method also includes predicting, by the trained confidence MLMs, second confidences that the third classifications are correct. The method also includes generating an aggregated ranked list of classes based on the third classifications and the second confidences. The method also includes training an ensemble confidence MLM using the aggregated ranked list of classes to generate a trained ensemble confidence MLM. The trained ensemble confidence MLM is trained to predict a corresponding selected classification for each corresponding data item in the third data set.

The one or more embodiments also provide for a system. The system includes a data repository. The data repository stores a new data set including new data items. The data repository also stores trained predictor MLMs. The trained predictor MLMs are trained to predict corresponding classifications of similar data items similar to the new data items. The data repository also stores trained confidence MLMs. The trained confidence MLMs are trained to predict first confidences including first probabilities that the corresponding classifications are correct. The data repository also stores an aggregated ranked list ranking the corresponding classifications. The aggregated ranked list includes sums of probabilities of classes predicted by the trained predictor MLMs weighted by the first confidences predicted by the confidence MLMs. Weighted is defined as a given probability of a class multiplied by a given probability of correctness. The data repository also stores a trained ensemble confidence MLM trained using the aggregated ranked list. The trained ensemble confidence MLM is trained to predict a corresponding selected classification for each corresponding data item in the similar data items. The system also includes an application programming interface (API) configured to receive the new data set. The system also includes a classification engine. The classification is configured to predict, using the trained predictor MLMs, new classifications for the new data items. The classification is also configured to predict, using the trained confidence MLMs, new confidences that the new classifications are correct. The classification is also configured to generate a new aggregated ranked list ranking the new classifications using a combination of the new classifications and the new confidences. The classification is also configured to predict, using the trained ensemble confidence MLM taking as input the new aggregated ranked list, selected classifications for the new data items.

Other aspects of the invention will be apparent from the following description and the appended claims.

DETAILED DESCRIPTION

Figure 1:
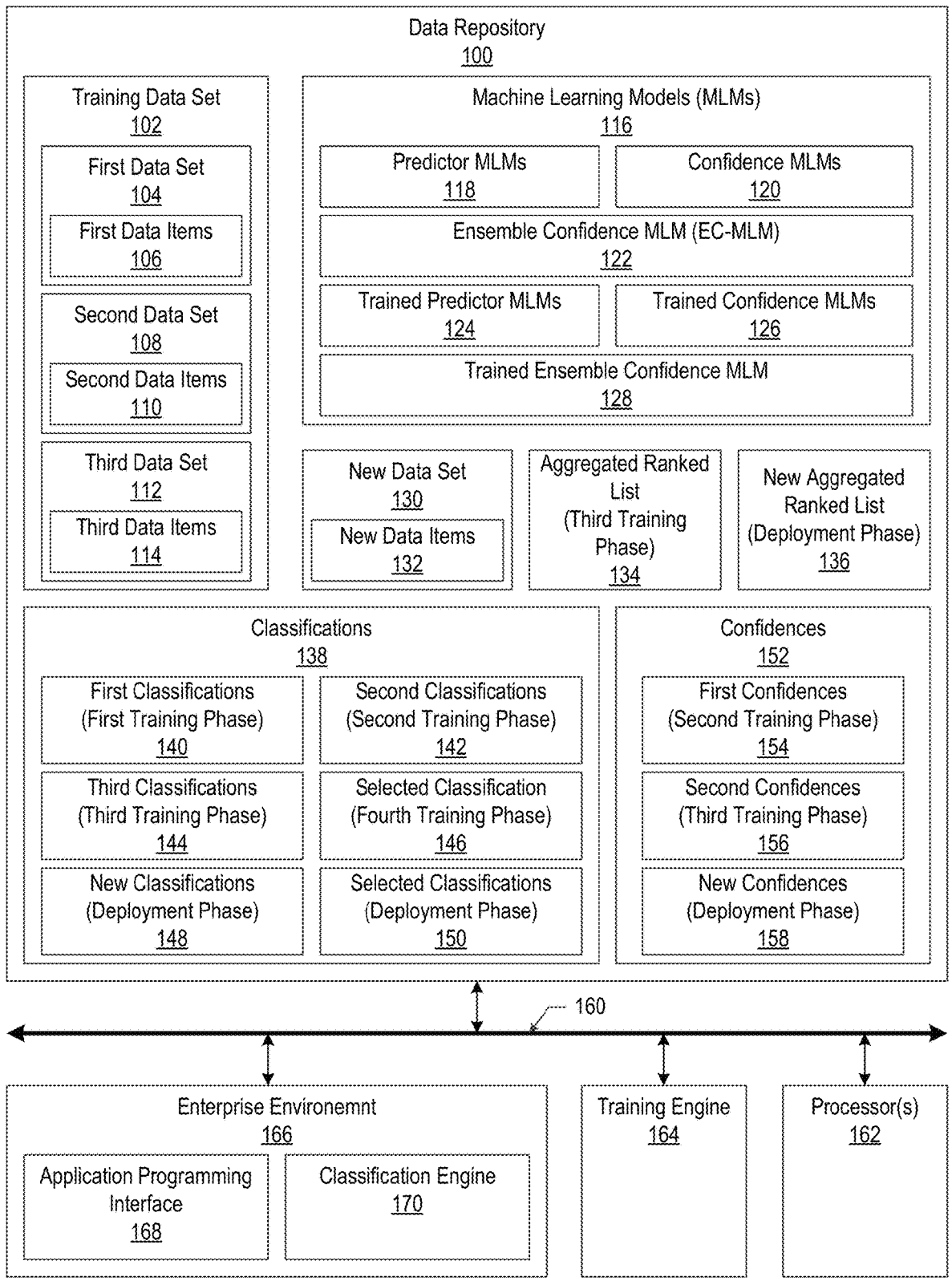
FIG. 1 shows a computing system, in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to the technical challenge of increasing the accuracy of automatic classification of data items by a computer. The one or more embodiments specifically relate to training and use of an ensemble confidence machine learning model (EC-MLM). The EC-MLM is trained to select, from among many different predicted classifications, the selected classification for a data item that is most likely to be the correct classification. Note that the term "ensemble" is used because multiple MLMs are used during the training of the EC-MLM; and, during use, the input of the EC-MLM involves the operation of multiple different MLMs. However, the EC-MLM itself is a single machine learning model with a set of inputs (predictions by underlying predictor MLMs weighted by confidence predictions by underlying confidence MLMs) and a set of outputs (selected predictions of classifications of data items in the underlying data set), not a conglomeration of multiple MLMs.

In summary, training and using the EC-MLM involves three different types of MLMs. The first type of MLM is a predictor MLM. Many different predictor MLMs are used to predict the classifications of data items in a data set. The second type of MLM is a confidence MLM. Many different confidence MLMs, one per predictor MLM, are used to predict a likelihood that the corresponding predictor MLM classified the data items correctly. The third type of MLM is the EC-MLM. The EC-MLM takes as input a ranked aggregated list of predicted classifications for the data items.

The ranked aggregated list is generated by, first, generating a set of numbers for each class. The set of numbers is generated by multiplying each prediction made by the predictor MLM for a given class by the corresponding confidence prediction made by the corresponding confidence MLM. Then, for each class, the set of multiplied numbers are summed. The resulting list of numbers for each class are then ranked in order of probability to form the ranked aggregated list. The ranked aggregated list is provided as input to the EC-MLM, which in turn outputs the selected classifications for each data item. In other words, the EC-MLM takes into account the predictions of many predictor MLMs together with the predicted confidence ratings of the predictor MLMs, and outputs a selected classification for a data item.

The training and use of the EC-MLM are described below with respect to FIG. 1 through FIG. 2D. A specific example of phases for training and using the EC-MLM are shown in FIG. 3A through FIG. 3F. A specific example of using the EC-MLM is described with respect to FIG. 4 through FIG. 11. FIG. 6 through FIG. 9 show test results demonstrating a significant improvement in classifications of data items using the EC-MLM, relative to using only one or more base predictor MLMs.

FIG. 1 shows a computing system, in accordance with one or more embodiments of the invention. The computing system shown in FIG. 1 includes a data repository (100), which may be characterized as a non-transitory computer readable storage medium. In one or more embodiments of the invention, the data repository (100) is a storage unit and/or device (e.g., a file system, database, collection of tables, or any other storage mechanism) for storing data. Further, the data repository (100) may include multiple different storage units and/or devices. The multiple different storage units and/or devices may or may not be of the same type and may or may not be located at the same physical site.

The data repository (100) stores a training data set (102). The training data set (102) is data having a number of data items for which classifications are known. The training data set (102) may be characterized as a full data set in some embodiments.

A data item is a subset of data that is individually classifiable. For example, a data item could be an email which, itself, is defined by a subset of data that include characters, words, headers, etc. However, the email, as a whole, is considered the data item because the email is to be classified into one of five classifications: malicious, junk, promotional, personal, and work. Many emails may be present in the training data set (102), and thus one may characterize the training data set (102) as having many data items. In the email example, the training data set (102) includes many emails, each of which have already been classified into one of the five classifications. In another example, a data item may be a financial transaction which is to be classified into a type of financial transaction for purposes of use by a financial management application (FMA). In this case, the training data set (102) includes many financial transactions, each of which has already been classified into a known type of financial transaction.

In the example of FIG. 1, pre-processing may have been performed in order to sort the training data set (102) into subsets of training data. Each subset of training data includes a number of data items for which classifications are known.

Specifically, for example, the training data set (102) may include a first data set (104) composed of first data items (106), as well as a second data set (108) composed of second data items (110), and a third data set (112) composed of third data items (114). More or fewer sets of data may be present in the training data set (102).

The first data set (104), the second data set (108), and the third data set (112) are used in training the MLMs described herein. Training of the MLMs is described in additional detail with respect to FIG. 2A through FIG. 3F.

The data repository (100) also stores multiple machine learning models (MLMs) (116). A MLM is a computer program that has been trained to recognize certain types of patterns. Training a MLM changes the MLM by changing the parameters defined for the MLM. Thus, once changed, a MLM may be referred-to as a "trained" MLM. A trained MLM is different than the untrained MLM, because the process of training transforms the untrained MLM. The training may be an ongoing process. Thus, a trained MLM may be retrained and/or continually trained. Further, an untrained MLM may be a pre-trained MLM that has a certain amount of training performed.

The MLMs (116) thus include a number of different types of MLMs. Specifically, the one or more embodiments contemplate multiple predictor MLMs (118). A predictor MLM is a MLM configured to take, as input, the data items in the training data set (102), or the data items in a subset of the training data set (102). The predictor MLM is configured to produce, as output, the predicted classifications of the data items. The output may take the form of all of the classifications with associated probabilities of classification. For example, an email may be predicted to be 90% likely to be malicious, 5% likely to be junk, 3% likely to be promotional, 1.5% likely to be personal, and 0.5% likely to be work-related. Examples of predictor MLMs (116) include any multiclass classification model that can output class probabilities, such as for example Logistic Regression, Naïve Bayes, Random Forrest or any Neural Network with last layer using a SoftMax activation function.

An assumption is made that the predictor MLMs (118) include two or more different types of MLMs. For example, each of the different predictor MLMs (118) has a set of parameters defined differently (making the different MLMs different), or alternatively are a different type of MLM (neural network, supervised learning, etc.). Thus, each of the predictor MLMs (118) does not necessarily produce, when executed, the same probabilities of classifications of data items.

In addition, the MLMs (116) also include multiple confidence MLMs (120). A confidence MLM is a MLM configured to take, as input, the output of a corresponding predictor MLM. The confidence MLM is configured to produce, as output, a predicted probability that the predicted classifications made by the corresponding predictor MLM are correct. In an embodiment, each confidence MLM is paired with a corresponding predictor MLM on a one-to-one basis. Thus, stated differently, the input of a confidence MLM is the probabilities associated with the various classifications as determined by the predictor MLM, and the output of the confidence MLM is one or more probabilities that the prediction probabilities made by the corresponding predictor MLM were correct. The term "confidence" is used to describe the confidence MLMs, because the output of the confidence MLMs is an expression of the degree of confidence that can be placed in the accuracy of the predictor MLMs. Examples of confidence MLMs (120) include any binary classification model that can output class probabilities, such as for example Logistic Regression, Naïve Bayes, Random Forrest or any Neural Network with last layer using a Sigmoid activation function.

In addition, the MLMs (116) includes an ensemble confidence MLM (EC-MLM). The EC-MLM (122) is a machine learning model configured to take, as input an aggregated ranked-list of weighted classifications, as described further below, though briefly the input is a combination of the outputs of the predictor MLMs (118) and the confidence MLMs (120). The EC-MLM (122) produces, as output, selected classifications for data items in the data set. Examples of EC-MLM (122) include any binary classification model that can output class probabilities, such as for example Logistic Regression, Naïve Bayes, Random Forrest or any Neural Network with last layer using a Sigmoid activation function.

As indicated above, training changes a MLM. Thus, the MLMs (116) also include trained MLMs. Specifically, the MLMs (116) include a trained predictor MLMs (124), a trained confidence MLMs (126), and a trained EC-MLM (128). The inputs and the outputs for each MLM are similar to those described above; however, the trained MLMs have different parameters than the corresponding predictor MLMs (118), confidence MLMs (120), and EC-MLM (122).

Figure 2A:
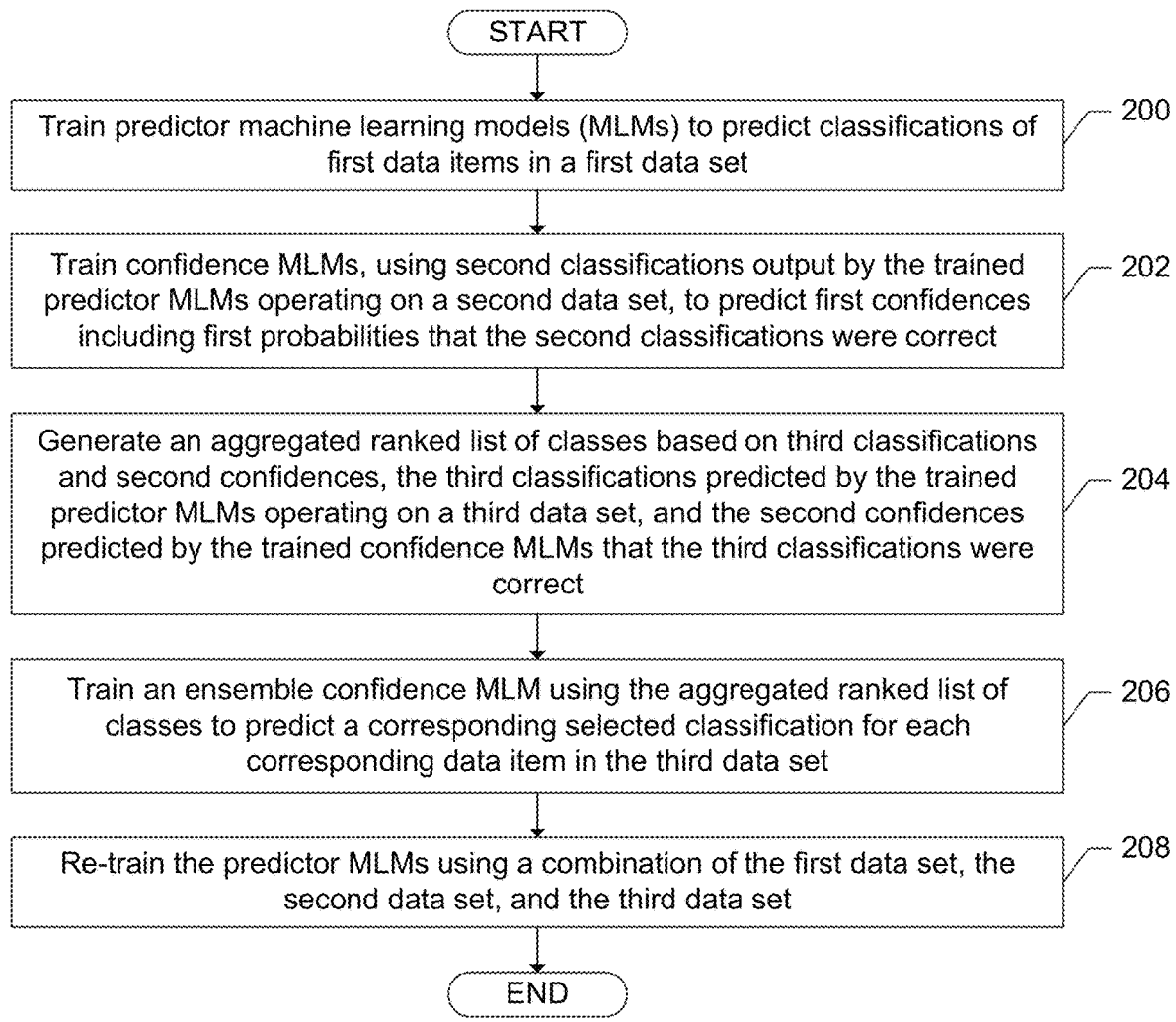
FIG. 2A, FIG. 2B, FIG. 2C, and FIG. 2D show flowcharts of methods for training and using an ensemble confidence MLM, in accordance with one or more embodiments of the invention.
Figure 2B:
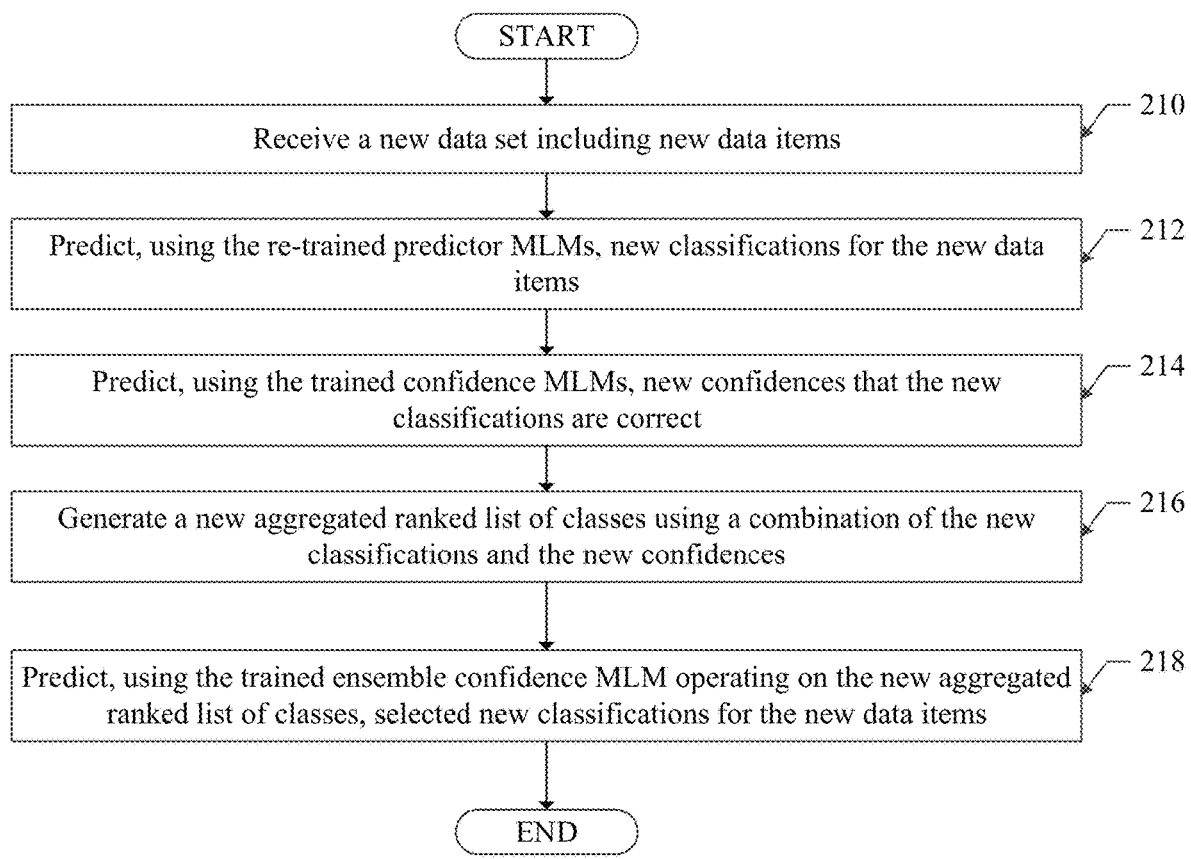
Figure 2C:
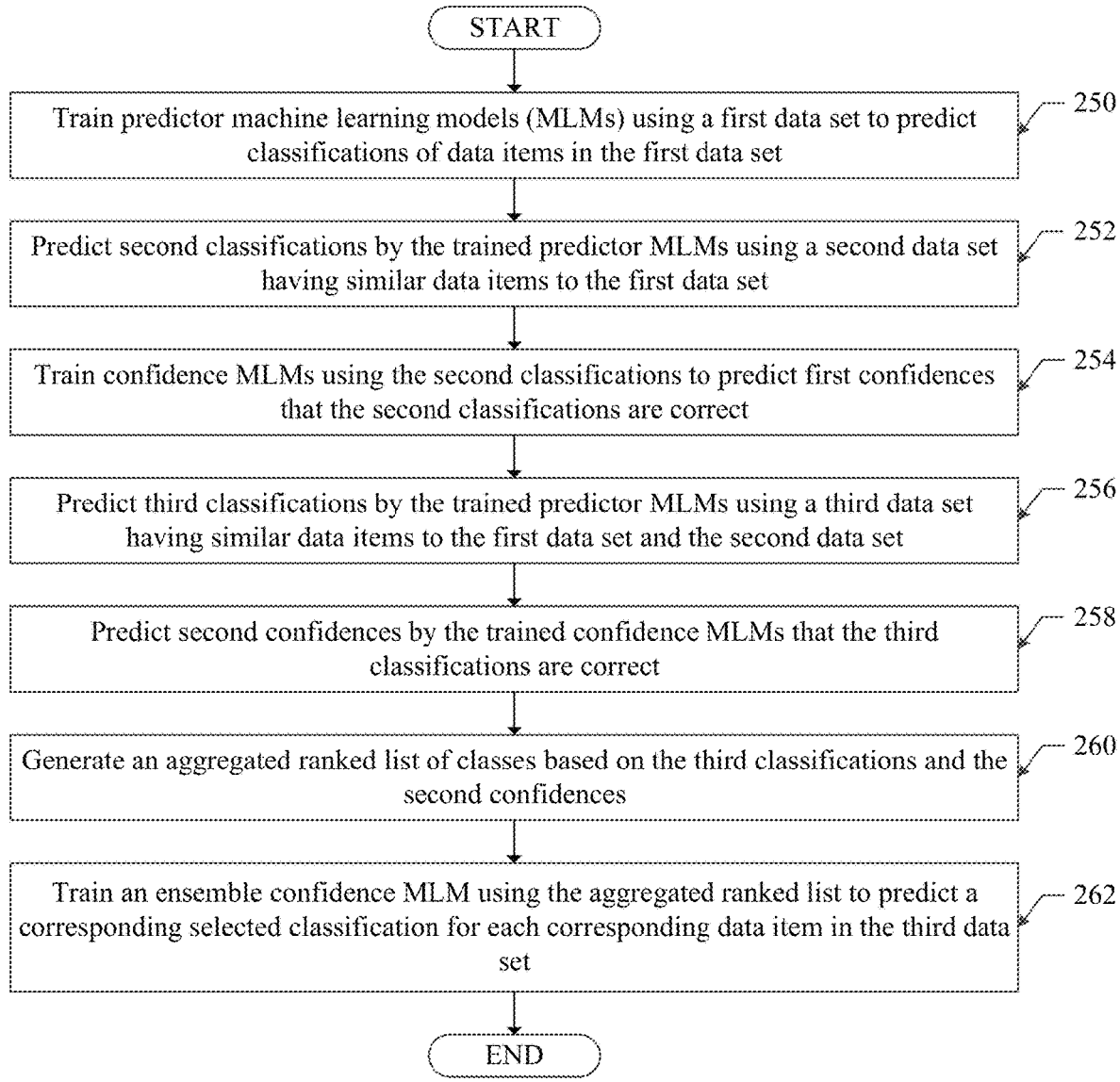
Figure 2D:
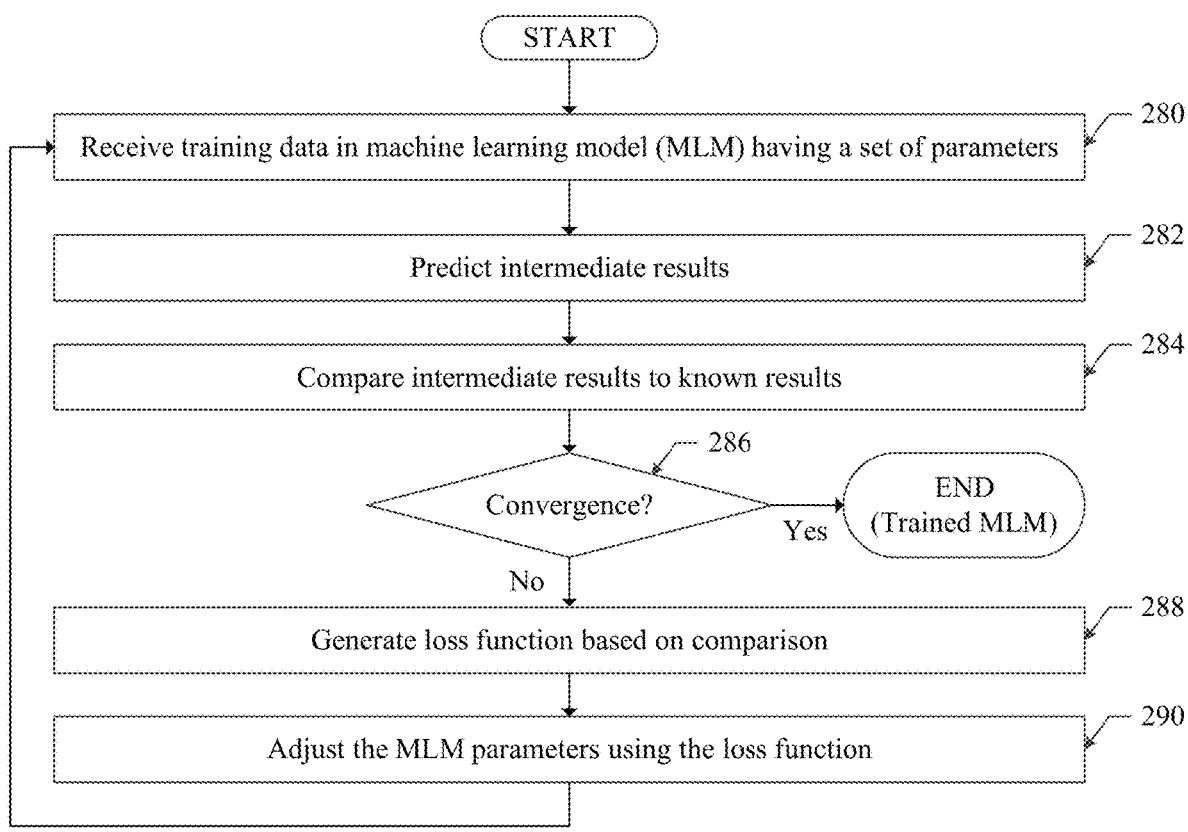

The process of training a MLM generally is described with respect to FIG. 2D. The process of specifically training the various MLMs described above is described with respect to FIG. 2A through FIG. 2C, as well as FIG. 3A through FIG. 3F.

The data repository (100) also includes a new data set (130). The term "new" is used only to indicate that the new data set (130) is different than the training data set (102). Specifically, the new data set (130) contains new data items (132) for which classifications are initially unassigned or unknown. Stated differently, the new data set (130) is a set of new data items (132) for which classifications are to be predicted according to the one or more embodiments described below. As such, the "new" data set may be existing data that is not yet classified.

The data repository (100) also stores an aggregated ranked list (134). The aggregated ranked list (134) is a rank assigned to a classification of a data item. The rank is a sum of numbers. Each number is determined by multiplying the prediction value of a data item by a corresponding predictor MLM times the confidence prediction value of the corresponding confidence MLM. Thus, the rank assigned to a class is the sum of the first predictor value times the first confidence value for item 1, plus the second predictor value times the second confidence value for item 1, plus the third predictor value times the third confidence value for item 1, etc. until all predictor MLM outputs and corresponding confidence MLM outputs for a given class are accounted. Mathematically, the rank of a class is expressed as:

$$R_h = \sum_{1}^{N}(P_{ih} * C_{ih})$$

where "$R_h$" is the rank of class "h", the symbol "$\Sigma$" is the mathematical operator indicating a sum of multiple numbers, "N" is the total number of predictions and thus corresponds to the number of predictor MLMs and the number of confidence MLMs, "$P_{ih}$" is the probability of classification predicted by the "$i^{th}$" predictor MLM of class "h", "$C_{ih}$" is the confidence prediction by the "$i^{th}$" confidence MLM of class "h", the term "i" is an index, and wherein the summation is from i=1 to N. Thus, for example, with respect to the specific example shown in FIG. 3D, for which there are only two classes shown for clarity, the above equation for determining the rank (378A) of class A and the rank (378B) of class B can be re-written more simply as:

$$R_A=(P_{1A}*C_{1A})+(P_{2A}*C_{2A})(\text{Rank}(378A) \text{ for Class } A)$$

$$R_B=(P_{1B}*C_{1B})+(P_{2B}*C_{2B})(\text{Rank}(378B) \text{ for Class } B)$$

Once all ranks for all classes are known, the classes are ranked from the highest sum of values to the lowest sum of values. The aggregated ranked list (134) is used during the training of the EC-MLM (122), as described in FIG. 2C and again with respect to FIG. 3D (phase 3 of training).

The data repository (100) also stores a new aggregated ranked list (136). The new aggregated ranked list (136) is similar in nature to the aggregated ranked list (134). However, the new aggregated ranked list (136) is used during the deployment phase of the one or more embodiments, and thus is generated when classifying the new data items (132) in the new data set (130).

As indicated above, the output of the predictor MLMs (118) and the trained predictor MLMs (124) are classifications. The classifications (138) are all predictions that a data item is classified in a particular classification. However, the process of training the predictor MLMs (118) and using the trained predictor MLMs (124) involves multiple stages, as described in FIG. 2A through FIG. 2C, as well as FIG. 3A through FIG. 3F. Furthermore, the outputs of the EC-MLM (122) and the trained EC-MLM (128) are also classifications of data items. Thus, for clarity, different names are assigned to different specific classifications performed at each phase of training and deployment.

For this reason, the classifications (138) may be characterized as including first classifications (140). The first classifications (140) are classifications output by the predictor MLMs (118) during a first training phase, described for example in FIG. 3B.

The classifications (138) may be characterized as including second classifications (142). The second classifications (142) are classifications output by the trained predictor MLMs (124) during a second training phase, described for example in FIG. 3C.

The classifications (138) may be characterized as including third classifications (144). The third classifications (144) are classifications output by the trained predictor MLMs (124) during a third training phase, described for example in FIG. 3D.

The classifications (138) may be characterized as including selected classifications (146). The selected classifications (146) are classifications output by the EC-MLM (122) during a fourth training phase, described for example in FIG. 3E.

The classifications (138) may be characterized as including new classifications (148). The new classifications (148) are output by the re-trained MLMs, which are a newly trained version of the trained predictor MLMs (124). The new classifications (148) are produced as part of the deployment phase when classifying the new data items (132) of the new data set (130), described for example in FIG. 3F.

The classifications (138) may be characterized as including selected classifications (150). The selected classifications (150) are the output of the trained EC-MLM (128) during the deployment phase, described for example in FIG. 3F.

A similar nomenclature pattern is used for the outputs of the confidence MLMs (120) and the trained confidence MLMs (126). Thus, the data repository (100) also includes confidences (152). The confidences (152) are confidence predictions output by the confidence MLMs (120) or the trained confidence MLMs (126).

The confidences (152) include first confidences (154). The first confidences (154) are output by the confidence MLMs (120) as part of the second training phase, as described with respect to FIG. 3C.

The confidences (152) include second confidences (156). The second confidences (156) are output by the trained confidence MLMs (126) as part of the third training phase, as described with respect to FIG. 3D.

The confidences (152) include new confidences (158). The new confidences (158) are output by the trained confidence MLMs (126) as part of the deployment phase, as described with respect to FIG. 3F.

The system shown in FIG. 1 also includes other components. For example, the system shown in FIG. 1 also includes a bus system (160). The bus system is one or more wired and/or wireless communication links that allow software and/or hardware to communicate with the data repository (100).

The system shown in FIG. 1 also includes one or more processors, such as processor(s) (162). The processor(s) (162) are described with respect to FIG. 12A and FIG. 12B. The processor(s) (162) may execute software associated with the training and deployment of the MLMs (116). The processor(s) (162) may also execute commands to transfer data as required via the bus system (160).

The system shown in FIG. 1 may also include a training engine (164). The training engine (164) is software and/or hardware which, when executed by the processor(s) (162), performs the computerized execution that accomplishes the training phases described with respect to FIG. 2A through FIG. 3E.

The system shown in FIG. 1 also includes an enterprise environment (166). An enterprise system (enterprise environment (166)), as used herein, is a set of hardware and/or software used to accomplish a technical result for an organization. For example, an enterprise system may be hardware and/or software designed to execute and provide user access to software programs as a service (SaaS) over the Internet. An enterprise may be large, e.g., providing the SaaS to tens of thousands of users concurrently. The SaaS may be, for example, a financial management application.

The enterprise may, as part of providing the SaaS, provide classification services of data input by users. Thus, for example, the enterprise environment (166) may include the training engine (164) and the MLMs (116) described above.

In particular, the enterprise environment (166) may include an application programming interface (API) (168). Generally, an API (168) is a computing interface to a software component or a system that defines how other components or systems can use that software component or system. For example, the API (168) may define the kinds of calls or requests that can be made, how to make them, the data formats that should be used, the conventions to follow, etc. In the one or more embodiments, the API (168) is provided to facilitate the transmission of data, such as the new data set (130), from remote users to the enterprise environment (166), and/or the data repository (100), training engine (164), and processor(s) (162).

The enterprise environment (166) may also include a classification engine (170). The classification engine (170) is software and/or hardware which, possibly when executed by the processor(s) (162), performs the computerized execution that accomplishes the deployment phase described with respect to FIG. 2B and FIG. 3F.

While FIG. 1 shows a configuration of components, other configurations may be used without departing from the scope of the invention. For example, various components may be combined to create a single component. As another example, the functionality performed by a single component may be performed by two or more components.

FIG. 2A through FIG. 2D should be considered together. FIG. 2A through FIG. 2D relate to various aspects of training and using the trained EC-MLM (128) described with respect to FIG. 1.

Turning first to FIG. 2A, shown is a flowchart of a method for training an ensemble confidence MLM, in accordance with one or more embodiments of the invention. The method of FIG. 2A may be implemented using the training engine (164) shown in FIG. 1.

At step 200, multiple predictor MLMs are trained to predict classifications of first data items in a first data set. In particular, each of a number of different predictor MLMs are trained to predict the same first data items in the same first data set. However, because the multiple predictor MLMs are different than each other, each predictor MLM will produce at least somewhat different classification results when operating on the same new data set, even though all of the predictor MLMs were trained on the same first data. Training may take place according to the method shown in FIG. 2D. The input during training is the first data set, and intermediate outputs are compared to the known classifications of the known data set.

At step 202, multiple confidence MLMs are trained, using second classifications output by the second predictor MLMs operating on a second data set, to predict first confidences including first probabilities that the second classifications were correct. In other words, prior to step 202, the predictor MLMs trained at step 200 were used to predict classifications of data items in a second data set similar to the first data set. Again, because multiple confidence MLMs are different than each other, each confidence MLM will produce at least somewhat different confidence predictions when operating on the same new data set, even though all of the confidence MLMs were trained on the same input data. Training may take place according to the method shown in FIG. 2D. The input during training is the outputs of the trained predictor MLMs operating on the second data set. The intermediate outputs of the confidence MLMs are compared to the known classifications of the known data sets, with the correct classification being represented as having a 100% probability of being correct.

Stated differently, the relationship between the confidence MLMs and the predictor MLMs is that the confidence MLMs predict the probability that the predictor MLMs correctly predicted the classification of the data items. Thus, the input to the confidence MLMs is the output of the predictor MLMs. The output of the confidence MLMs are probabilities that the predictions of the confidence MLMs were correct.

At step 204, an aggregated ranked list of classes is generated based on third classifications and second confidences, the third classifications predicted by the trained predictor MLMs operating on a third data set, and the second confidences predicted by the trained confidence MLMs that the third classifications were correct. In other words, the third classifications are predicted by the trained predictor MLMs operating on the third data set, which produce a third set of predicted classifications. In turn, the second confidences are predicted by the trained confidence MLMs operating on the output of the trained predictor MLMs operating on the third data set. The aggregated ranked list, itself, is generated as follows. For each class, and for each predictor, multiply the probability of prediction generated by a trained predictor MLM by the probability generated by a corresponding trained confidence MLM. The sum of all such multiplications over the various predictor MLMs and confidence MLMs is then added for a given class. The results over all classes are ranked. An example formula for this procedure is shown in FIG. 3D.

At step 206, an ensemble confidence MLM is trained using the aggregated ranked list of classes to predict a corresponding selected classification for each corresponding data item in the third data set. In other words, the input to the EC-MLM during training is the ranked list of classes determined at step 204. The output of the EC-MLM is a selected classification for a given data item. In other words, the EC-MLM acts as an automatic evaluation tool that evaluates all possible classifications of a given data item among all the different predictor MLMs, and selects the most likely classification for that given data item. Note that the EC-MLM does not operate necessarily according to a vote (i.e. the number of predictor MLMs predicting the selected classification), or the strongest prediction by a few predictor MLMs. Rather, the prediction is based on the formulas defining the EC-MLM as modified by the parameters set for the EC-MLM. In any case, the intermediate output of the EC-MLM is the selected classification for each of the data items in the third data set. Training of the EC-MLM proceeds according to the method shown in FIG. 2D.

At step 208, the predictor MLMs are re-trained using a combination of the first data set, the second data set, and the third data set. In other words, each of the predictor MLMs are trained again using the procedure described above, and as further shown in FIG. 2D; however, re-training is performed using all three of the first data set, the second data set, and the third data set. Re-training is performed because the predictor MLMs may be more sensitive to the amount of data used in training, whereas the confidence MLMs and the EC-MLM tend to be more stable and use less data for proper training. In an embodiment, the three data sets are part of a full data set that had been pre-processed into the three data sets. In any case, the results of re-training are newly trained predictor MLMs that will be used in a later deployment phase. In one embodiment, the method of FIG. 2A may terminate thereafter.

The method of FIG. 2A may be varied or extended. For example, the intervening predicting steps during training may be added. An example of the addition of intervening predicting steps, by both the predictor MLMs and the confidence MLMs, is shown in the method of FIG. 2C.

In an embodiment, the trained EC-MLM and the re-trained predictor MLMs are deployed to or stored in an enterprise system. The enterprise system may then perform the deployment phase using the trained EC-MLM, the trained confidence MLMs, and the re-trained predictor MLMs.

In another embodiment, first outputs of the trained predictor MLMs are first corresponding vectors of numbers that indicate first corresponding probabilities that the first data items correspond to the first classifications. Additionally, second outputs of the trained predictor MLMs are second corresponding vectors of numbers that indicate second corresponding probabilities that the third data items correspond to the third classifications. These arrangements are shown in the examples of FIG. 3B and FIG. 3C.

In still another embodiment, the method of FIG. 2A may include a data pre-processing step. In particular, prior to any training step, a full training data set (i.e., a full data set) may be partitioned into the first data set, the second data set, and the third data set. In this manner, each of the three data sets include similar data items.

As indicated above, the predictor MLMs may be more sensitive to an amount of data available for training, relative to the confidence MLMs and the EC-MLM. Thus, for example, the first data set may be larger than a combination of the second data set and the third data set. In an embodiment, the first data set my compose 90% or more of the data. However, these relative values may vary in other embodiments.

FIG. 2B shows a flowchart of a method for using a trained ensemble confidence MLM, in accordance with one or more embodiments of the invention. Thus, the method of 2B may be performed after the training phases described above in FIG. 2A. The method of FIG. 2B may be performed using the classification engine (170) shown in FIG. 1.

At step 210, a new data set including new data items is received. For example, the API of an enterprise system may receive new data having new data items that are to be classified.

At step 212, new classifications for the new data items are predicted using the re-trained predictor MLMs. The new data is provided as input to the re-trained predictor MLMs. The output of the re-trained predictor MLMs are predictions of probabilities that the data items are assigned to a particular class. In an embodiment, each predictor MLM predicts a probability that a data item belongs to all of the potential classes. For example, assuming that there are three possible classes data could be sorted into, the output of a predictor MLM may be x % that data item 1 is in class A, y % that data item 1 is in class B, and z % that data item 1 is in class C. The predictor MLM will also output predictions for class A, class B, and class C for each of the data items in the new data set. The class having the highest probability may be selected as being the predicted class for a given data item. Continuing the example, assume that class B had the highest probability; thus, data item 1 would be predicted by predictor 1 as being classified as class B.

At step 214, new confidences that the new classifications are correct are predicted using the trained confidence MLMs. Thus, the output generated at step 212 acts as input to the trained confidence MLMs. The output of the confidence MLMs is a series of probabilities that the corresponding predictor MLM was correct for a given class. Thus, continuing the example, the output of confidence MLM 1 may be x % that predictor MLM 1 was correct that class B should be assigned to data item 1.

At step 216, a new aggregated ranked list of classes is predicted using a combination of the new classifications and the new confidences. The aggregated ranked list is determined in a similar manner as described above in step 204 of FIG. 2A. However, the determination is made using the outputs of the re-trained predictor MLMs and the trained confidence MLMs operating on the new data set.

At step 218, selected new classifications for the new data items are predicted using the trained ensemble confidence MLM operating on the new aggregated ranked list of classes. Again, the input to the EC-MLM is the aggregated ranked list. The output is the selected classification. In one embodiment, the method of FIG. 2B may terminate thereafter.

Later, the selected classification may be assigned to the data item for the purposes of additional processing. For example, an email data item may be classified as "personal" and, using a rule, delivered to a "personal" inbox for a user. In another example, an electronic transaction may be classified as "travel," and treated accordingly using rules in financial management software.

FIG. 2C shows a flowchart of another method for training an ensemble confidence MLM, in accordance with one or more embodiments of the invention. The method of FIG. 2C is a variation and an extension of the method described with respect to FIG. 2A. The method of FIG. 2C may be performed using the training engine (164) shown in FIG. 1.

At step 250, predictor machine learning models (MLMs) may be trained using a first data set to predict classifications of data items in the first data set. Training is similar to the training described with respect to step 200 in FIG. 2A.

At step 252, second classifications are predicted by the trained predictor MLMs using a second data set having similar data items to the first data set. In other words, the trained predictor MLMs operate on a different training data set that is similar to the first training data set. "Similar" means that both data sets include the same types of classifications, but possibly different data items.

At step 254, the confidence MLMs are trained using the second classifications to predict first confidences that the second classifications are correct. In other words, the confidence MLMs predict the probability of correctness of the classifications performed at step 252.

At step 256, third classifications are predicted by the trained predictor MLMs using a third data set having similar data items to the first data set and the second data set. In other words, the predictor MLMs trained at step 250 execute again, but this time take as input a third data set that is similar to both the second data set and the first data set. Again, the result is a prediction of classifications of data items in the third data set.

At step 258, second confidences are predicted by the trained confidence MLMs that the third classifications are correct. In other words, the trained confidence MLMs predict the probabilities that the classifications performed by the predictor MLMs at step 256 were correct.

At step 260, an aggregated ranked list of classes is generated based on the third classifications and the second confidences. The generation of the ranked aggregated list is performed in a manner similar to that described with respect to step 204 of FIG. 2A.

At step 262, an ensemble confidence MLM is trained using the aggregated ranked list to predict a corresponding selected classification for each corresponding data item in the third data set. In other words, the actual classification selected for a given data item is predicted by the EC-MLM. The EC-MLM acts as a "clearinghouse" of the various predictions made by the predictor MLMs and the confidence MLMs. In one embodiment, the method of FIG. 2C may terminate thereafter.

FIG. 2D shows a flowchart of a method for training an individual MLM, in accordance with one or more embodiments of the invention. The method shown in FIG. 2D may be performed by the training engine (164) shown in FIG. 1. The method shown in FIG. 2D may be modified to accommodate the training of any of the predictor MLMs, confidence MLMs, or the EC-MLM by selecting the appropriate type of MLM, setting the parameters for the MLM, and providing the appropriate input as described above with respect to FIG. 2A through FIG. 2C.

At step 280, the machine learning model (MLM) receives training data having a set of parameters. The MLM may receive the data in the form of a vector of numbers, which may be a "one hot vector". A "one hot vector" is a one dimensional matrix of data, with each cell in the matrix representing a particular aspect of data in the training data set. In some cases, a vector may be a multi-dimensional matrix of data. Note that a "data item," as defined and used above, may be expressed as multiple entries in the vector.

At step 282, intermediate results are predicted. In other words, the MLM predicts a preliminary predicted result from the training data. The preliminary predicted result may be a set of probabilities that a given data item is associated with a particular class, as described above.

At step 284, the intermediate results are compared to known results. During training, the data scientist uses training data for which the results are already known. Thus, for example, the data scientist has a set of classifications for data items that are known to be correct classifications. At step 284, the intermediate results of the MLM are compared to the known results. If a particular classification of a particular data item matches the known result for that data item, then the MLM is determined to be correct with respect to that particular data item. If the particular classification does not match the known result, then the MLM is determined to be incorrect with respect to the particular item. In most cases, the MLM will correctly classify some, but not all, data items.

At step 286, a determination is made whether convergence has been achieved. Convergence occurs when differences between the intermediate results of the MLM and the known results are within a pre-determined percentage of each other. For example, if 99% of the intermediate results match the known results, then convergence may be defined as having occurred. The exact percentage, and evaluation of the degree of match, may vary in different embodiments. In any case, if convergence occurs, then the method of FIG. 2D may terminate thereafter.

However, at step 288, assuming convergence has not occurred at step 286, then a loss function is generated based on the comparison. A loss function is a quantifiable set of adjustments to the parameters of the MLM intended to cause the next execution of the MLM to produce new intermediate results that are closer to known results, relative to the prior execution output of the MLM. The exact adjustments made to the parameters vary with the type of MLM and the degree of divergence between the intermediate results and the known results.

At step 290, the MLM parameters are adjusted using the loss function. Adjustment of the parameters is performed automatically by the training engine by applying the loss function to the MLM parameters.

The process then returns to step 280, where training data is received at the MLM. The process repeats iteratively until convergence is achieved at step 286, whereupon the process terminates.

While the various steps in the flowcharts of FIG. 2A through FIG. 2D are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

Attention is now turned to FIG. 3A through FIG. 3F, which represents a pictorial example of the processes described with respect to FIG. 2A through FIG. 2D using the system shown in FIG. 1. The example of FIG. 3A through FIG. 3F is for explanatory purposes only and not intended to limit the scope of the invention. Throughout FIG. 3A through FIG. 3F, the same reference numerals refer to the same objects having the same definitions.

Figure 3A:
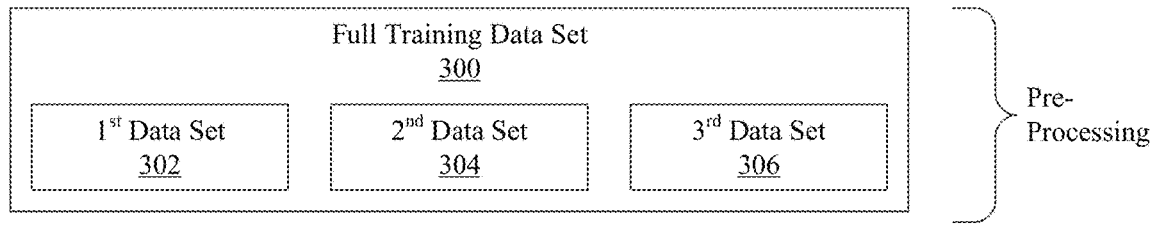
FIG. 3A, FIG. 3B, FIG. 3C, FIG. 3D, FIG. 3E, and FIG. 3F show phases of MLM training and deployment, in accordance with one or more embodiments of the invention.
Figure 3B:
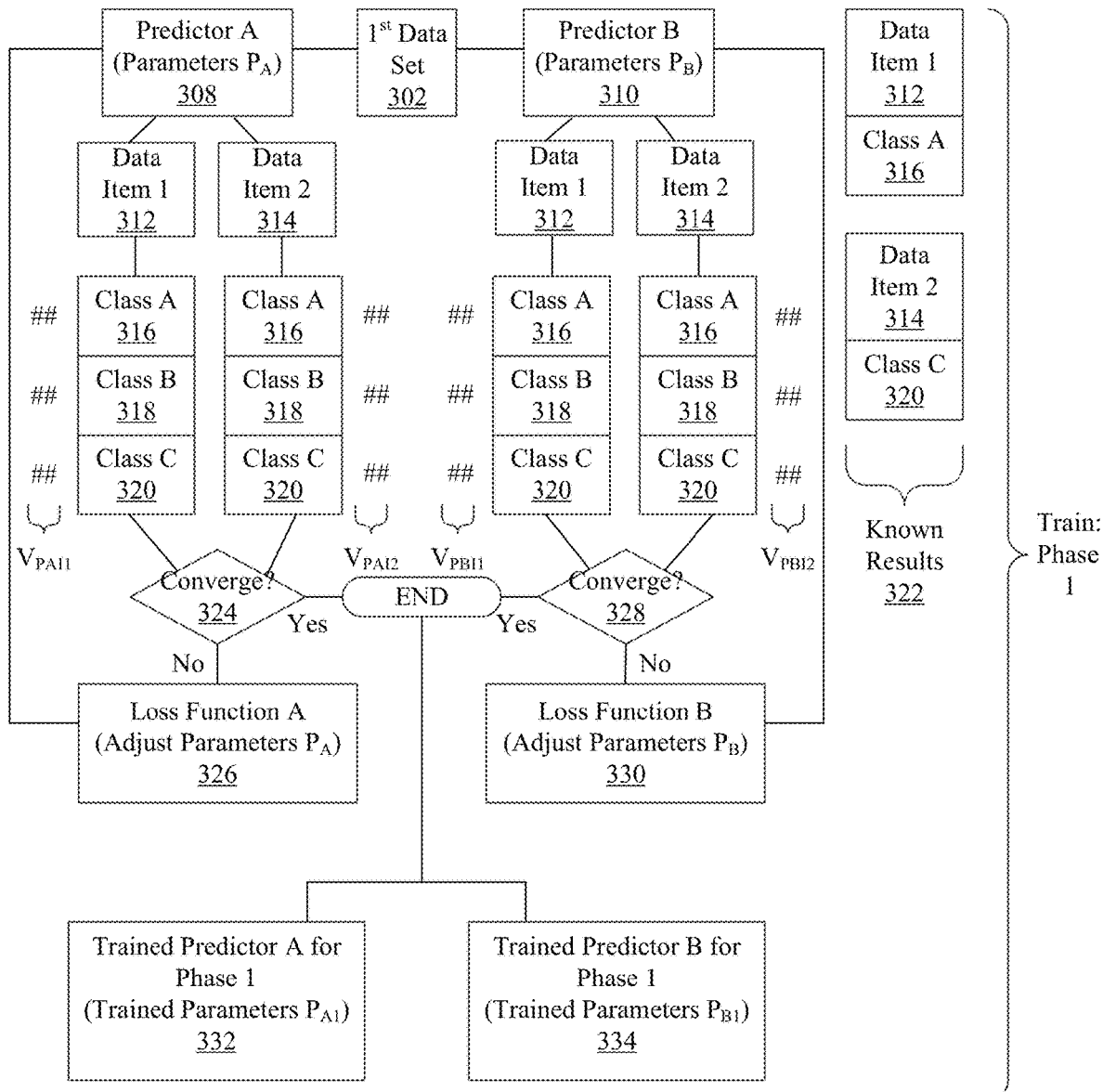
Figure 3C:
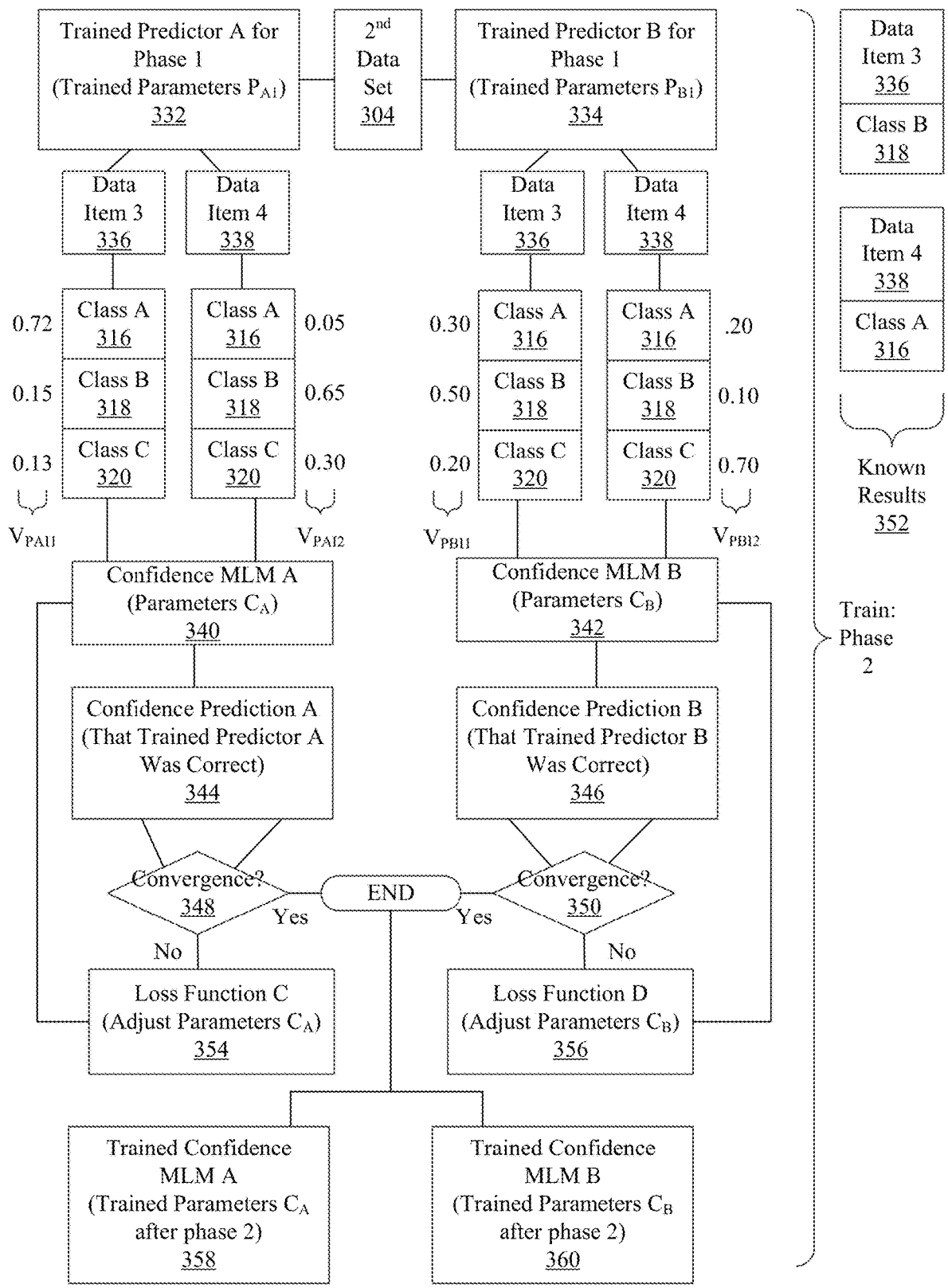
Figure 3D:
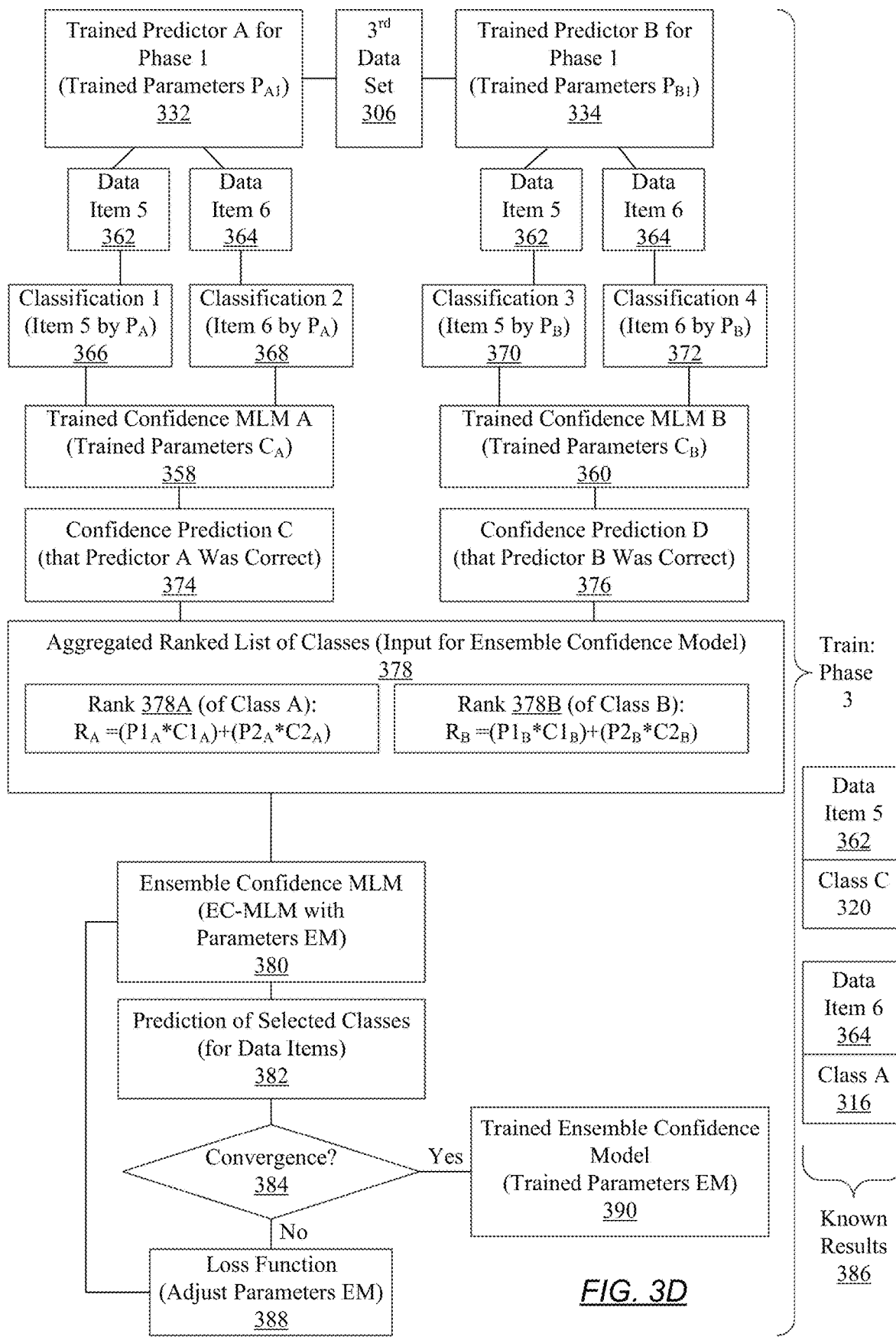

FIG. 3A shows a pre-processing phase before MLM training, in accordance with one or more embodiments of the invention. A full training data set (300) is provided. The full training data set (300) includes many data items, for which corresponding classifications are known. The full training data set (300) is pre-processed by dividing the full training data set (300) into subsets of data; namely, a first data set (302), a second data set (304), and a third data set (306). Each of the first data set (302), second data set (304), and third data set (306) include the same or different data items, for which the same types of classifications are possible, relative to the full training data set (300). In an embodiment, the first data set (302) is larger than a combination of the second data set (304) and the third data set (306), as described above.

FIG. 3B shows a first phase of MLM training, in accordance with one or more embodiments of the invention. The first phase of training involves an initial training of the predictor MLMs.

Many predictor MLMs may be present. However, for clarity, only two predictor MLMs are shown in FIG. 3B: Predictor A (308) and Predictor B (310). Predictor A (308) has parameters defined as $P_A$, and Predictor B (310) has parameters defined as $P_B$. The first data set (302) is provided as input to the Predictor A (308) and the Predictor B (310) (and other predictor MLMs, if present).

Predictor A (308) predicts classifications for data item 1 (312) and for data item 2 (314). Similarly, Predictor B (310) also predicts classifications for data item 1 (312) and data item 2 (314). Each data item may be defined by subsets of data within the first data set (302); however, the data item is treated as a unit for purposes of classification. For example, the data item may be an email to be sorted, an electronic transaction to be sorted for use by a financial management application, a scientific measurement to be classified, etc.

For clarity, assume that only two data items are being classified, data item 1 (312) and data item 2 (314). Likewise, assume that only three classes, Class A (316), Class B (318), and Class C (320) exist. Thus, data item 1 (312) is properly classified as being in only one of Class A (316), Class B (318), or Class C (320), and likewise that data item 2 (314) is properly classified as being in only one of Class A (316), Class B (318), or Class C (320). Because the first data set (302) is a part of a training data set, the known results (322) is that 212 is properly classified in Class A (316), and that data item 2 (314) is properly classified in Class C (320).

The results of each predictor MLM is a series of numbers produced for each data item. Each number represents the probability that the corresponding data item is in the corresponding class. Thus, for example, the Predictor A (308) predicts a set of numbers, $V_{PA\text{I}1}$, that the data item 1 (312) is in Class A (316), or that the data item 1 (312) is in Class B (318), or that the data item 1 (312) is in Class C (320).

One probability is assigned to each class for each data item. Thus, the Predictor A (308) also predicts a set of numbers, $V_{PA\text{I}2}$, which represents the corresponding three probabilities that the data item 2 (314) is in Class A (316), Class B (318), or Class C (320).

In addition, Predictor B (310) performs an independent prediction using the first data set (302). Thus, Predictor B (310) predicts a separate set of three probabilities, $V_{PB11}$, that the data item 1 (312) is in Class A (316), Class B (318), or Class C (320). Likewise, Predictor B (310) predicts another set of three probabilities, $V_{PB12}$, that the data item 2 (314) is in Class A (316), Class B (318), or Class C (320).

Next, a convergence determination is made by comparing the output of the Predictor A (308) to the known results (322). Specifically, at convergence decision (324), a comparison is made comparing the outputs of the Predictor A (308), $V_{PA11}$ and $V_{PA12}$, to the known results (322). If the outputs of the Predictor A (308) are within a threshold degree of match of the known results (322), then convergence occurs, and training terminates.

Otherwise, assuming convergence does not occur at convergence decision (324), a loss function A (326) is determined. The loss function A (326) is configured to adjust the parameters, $P_A$, in an effort to increase the probability that the prediction for both data item 1 (312) and the prediction of data item 2 (314) will be correct on a subsequent execution of the Predictor A (308) on the first data set (302).

A similar procedure is performed with respect to Predictor B (310). Again, a convergence determination is made by comparing the output of the Predictor B (310) to the known results (322). Specifically, at convergence decision (328), a comparison is made comparing the outputs of the Predictor B (310), $V_{PB11}$ and $V_{PB12}$, to the known results (322). Assuming convergence does not occur at convergence decision (328), a loss function B (330) is determined. The loss function B (330) is configured to adjust the parameters, $P_B$, in an effort to increase the probability that the prediction for both data item 1 (312) and the prediction of data item 2 (314) will be correct on a subsequent execution of the Predictor B (310) on the first data set (302). However, if at convergence decision (328) the outputs of the Predictor B (310) are within a threshold degree of match of the known results (322), then convergence occurs, and training terminates.

Thus, for both Predictor A (308) and Predictor B (310), the process of executing the predictor MLMs on the first data set (302) iterates until a convergence occurs at the convergence decision (324) and the convergence decision (328). Once convergence occurs, then the Predictor A (308) is changed, via the adjustments of the parameters $P_A$. Thus, the Predictor A (308) is now referred-to as a trained predictor A (332) having trained parameters $P_{A1}$. Similarly, the result of convergence for the training of Predictor B (310) is trained predictor B (334) having trained parameters $P_{B1}$. Note that the Predictor A (308) is not equivalent to the trained predictor A (332), and likewise the Predictor B (310) is not equivalent to the trained predictor B (334). The trained, intermediate, and untrained predictor MLMs are different and will produce different results when performing classification predictions because the parameters of the MLMs are different. Note also that time to convergence for the Predictor A (308) and the Predictor B (310) may be different.

Once training of the predictor MLMs is complete (i.e., the trained predictor A (332) and the trained predictor B (334) are produced), then training phase 1 is considered complete. Training phase 2 may now be performed, as shown in FIG. 3C.

FIG. 3C shows a second phase of MLM training, in accordance with one or more embodiments of the invention. The second phase of training involves training the confidence MLMs. Training of the confidence MLMs, in turn, uses the predictor MLMs trained during the first phase of training.

Specifically, initially, the trained predictor MLMs (i.e., trained predictor A (332) and trained predictor B (334)) are executed, taking the second data set (304) as input. Note that the first data set (302) is not used during phase 2, because the results of the predictors have already converged with respect to using the first data set (302) as input. Accordingly, the trained predictors classify different data items than the data items classified during phase 1. Specifically, the trained predictor A (332) predicts classifications for data item 3 (336) and data item 4 (338) in the second data set (304). Similarly, the trained predictor B (334) predicts the classifications for data item 3 (336) and data item 4 (338) in the second data set (304).

As with phase 1, the outputs of the trained predictor A (332) and the trained predictor B (334) are series of numbers representing the predicted probabilities that a given data item is assigned to a given class. Thus, for example, the output of trained predictor A (332) with respect to classifying data item 3 (336) is a vector, VPAI1, with entries of 0.72 for Class A (316), 0.15 for Class B (318), and 0.13 for Class C (320). In other words, trained predictor A (332) predicts a 72% chance that data item 3 (336) is properly classified as Class A (316), a 15% chance that data item 3 (336) is properly classified as Class B (318), and a 13% chance that data item 3 (336) is properly classified as Class C (320). The trained predictor A (332) also produces a vector, VPAI2, for the probabilities that data item 4 (338) is classified in the three available classes. Similarly, the trained predictor B (334) produces two vectors, VPBI1 and VPBI2, that the data item 3 (336) and the data item 4 (338), respectively, are classified in the three available classifications.

The output vectors of the trained predictor A (332), VPAI1 and VPAI2, become the input to confidence MLM A (340). The confidence MLM A (340) has parameters CA which influence the output of the confidence MLM A (340). Similarly, the output vectors of the trained predictor B (334), VPBI1 and VPBI2, become the input to confidence MLM B (342). Likewise, the confidence MLM B (342) has parameters CB which influence the output of the confidence MLM B (342).

The output of the confidence MLM A (340) is confidence prediction A (344). The confidence prediction A (344) is a prediction, expressed as a probability, that the predictions of data item 3 (336) and data item 4 (338) by trained predictor A (332) were correct. Similarly, the output of the confidence MLM B (342) is confidence prediction B (346). The confidence prediction B (346) is a prediction, expressed as a probability, that the predictions of data item 3 (336) and data item 4 (338) by trained predictor B (334) were correct.

Next, a determination is made whether convergence has occurred. Thus, at convergence decision (348), a determination is made whether the confidence prediction A (344) was correct. The confidence prediction A (344) is correct when the results of the trained predictor A (332) match, within a threshold degree of match, the known results (352), and also the confidence prediction A (344) is that the trained predictor A (332) was correct. Similarly, at convergence decision (350), a determination is made whether the confidence prediction B (346) was correct. The confidence prediction B (346) is correct when the results of the trained predictor B (334) match, within a threshold degree of match, the known results (352), and also the confidence prediction B (346) is that the trained predictor B (334) was correct.

If convergence does not occur at convergence decision (348) and convergence decision (350), then respective loss functions are determined. For example, loss function C (354) is determined by estimating changes to the parameters $C_A$ of the confidence MLM A (340) desired so that, on a subsequent execution run on the second data set (304), the output of the confidence MLM A (340) will be correct. The loss function C (354) is applied to change the parameters of the confidence MLM A (340), and then the same process described above reiterates. Similarly, loss function D (356) is determined by estimating changes to the parameters $C_D$ of the confidence MLM B (342) desired so that, on a subsequent execution run on the second data set (304), the output of the confidence MLM B (342) will be correct. The loss function D (356) is applied to change the parameters of the confidence MLM B (342), and then the same process described above reiterates.

Iteration continues until convergence. When convergence occurs at convergence decision (348) and convergence decision (350), then the respective training process for the confidence MLM A (340) and the confidence MLM B (342) is complete and training stops. At this point, a trained confidence MLM A (358) and a trained confidence MLM B (360) are established and stored. Training phase 2 is now complete.

FIG. 3D shows a third phase of MLM training, in accordance with one or more embodiments of the invention. The third phase of training involves training the ensemble confidence machine learning model (EC-MLM). Training of the EC-MLM involves executing the trained predictor MLMs on the third data set, predicting the accuracy of the trained predictors using the trained confidence MLMs, generating an aggregated ranked list based on the outputs of the predictor and confidence models, and then training the EC-MLM on the aggregated ranked list of classes.

Thus, as shown in FIG. 3D, phase 3 begins with providing the trained confidence MLM B (360) to the trained predictor A (332) and the trained predictor B (334). A third data set is used, because the outputs of the trained predictor A (332), trained predictor B (334), trained confidence MLM A (358), and trained confidence MLM B (360) would already be pre-determined if the first data set (302) and/or the second data set (304) were used for training during phase 3.

Thus, the trained predictor A (332) attempts to classify data item 5 (362) and data item 6 (364), with both present in the third data set (306). The outputs of the trained predictor A (332) are the classification 1 (366) of data item 5 (362) by trained predictor A (332), as well as the classification 2 (368) of data item 6 (364) by trained predictor A (332). Likewise, the outputs of trained predictor B (334) are the classification 3 (370) of data item 5 (362) by trained predictor B (334), as well as the classification 4 (372) of data item 6 (364) by trained predictor B (334).

In turn, the outputs of the trained predictor A (332) and the trained predictor B (334) are used as inputs by the trained confidence MLMs. Thus, the classification 1 (366) of data item 5 (362) by trained predictor A (332), as well as the classification 2 (368) of data item 6 (364) by trained predictor A (332), form the inputs to the trained confidence MLM A (358). Likewise, the classification 3 (370) of data item 5 (362) by trained predictor B (334), as well as the classification 4 (372) of data item 6 (364) by trained predictor B (334), form the inputs to the trained confidence MLM B (360).

The output of the trained confidence MLM A (358) is a confidence prediction C (374) that the trained predictor A (332) was correct. Likewise, the output of the trained confidence MLM B (360) is a confidence prediction D (376) that the trained predictor B (334) was correct.

At this point, in order to train the EC-MLM (380), an aggregated ranked list of classes (378) is generated to be used as input to the EC-MLM (380). The purpose of the EC-MLM (380) is to predict, from among all of the classifications made across all of the predictor MLMs, which classifications are the most likely to be the correct classifications for data item 5 (362) and data item 6 (364). Thus, the output of the EC-MLM (380) is a corresponding selected classification for each data item. In other words, the EC-MLM (380) will determine a first selected classification for data item 5 (362), and a second selected classification for data item 6 (364).

The aggregated ranked list of classes (378) represents the accumulated data of the outputs of the various trained predictor MLMs, as weighted by corresponding confidence MLMs. Thus, for example, the rank of class A will be a number equal to the sum of the following: i) the probability that trained predictor A (332) determined that data item 5 (362) is in Class A (316) times the probability that the trained predictor A (332) was correct, as determined by the trained confidence MLM A (358); and ii) the probability that trained predictor B (334) determined that data item 5 (362) is in Class A (316) times the probability that the trained predictor B (334) was correct, as determined by the trained confidence MLM B (360). Mathematically, the rank (378A) for Class A (316) can be expressed as $R_A=(P1_A*C1_A)+(P2_A*C2_A)$. Similar calculations are performed to determine the rank (378B) of Class B (318), as shown in FIG. 3D. More generally, the rank for a given class is expressed using the equation described with respect to FIG. 1, above.

The classes may then be ranked according to aggregated rankings, determined as described above. The resulting aggregated ranked list of classes (378) is then used as an input to the EC-MLM (380).

In turn, the EC-MLM (380) outputs a prediction of selected classes (382) for the data items. In other words, the EC-MLM (380) ultimately determines the class to which a data item is assigned. The output itself takes the form of a set of numbers assigned to the corresponding classes. The numbers reflect the predicted probability that a given item belongs to a corresponding class, in a manner similar to that described with respect to the predictor MLMs in FIG. 2B. The predicted classification corresponding to the highest probability is chosen as the selected classification.

Next, a determination is made whether convergence (384) has been achieved. The determination of convergence (384) is made by comparing the prediction of selected classes (382) to the known results (386) of the classifications of data item 5 (362) and data item 6 (364). If the degree of match between the prediction of selected classes (382) and the known results (386) is less than a pre-selected threshold, then convergence (384) does not occur.

In this case, a loss function (388) is determined. The loss function (388) is configured to change the parameters, EM, of the EC-MLM (380) in a manner which is estimated to cause the EC-MLM (380) to better achieve the known results (386) when executed again. The procedure of predicting the prediction of selected classes (382) using the EC-MLM (380) is then iteratively repeated, using the same aggregated ranked list of classes (378) determined above.

The iterative training continues until the convergence (384) is achieved. Upon the convergence (384), the EC-MLM (380) is considered trained. The resulting trained EC-MLM (390), with the trained parameters EM, is then stored and ready for later deployment.

In an embodiment, training may stop, and the deployment phase begin. However, in another embodiment, the predictor MLMs may be sensitive to the amount of data used to train the predictor MLMs. In other words, the more data is used to train the predictor MLMs, the more accurate the predictor MLMs become. However, the confidence MLMs and the EC-MLM tend to be less sensitive to the amount of data.

Figure 3E:
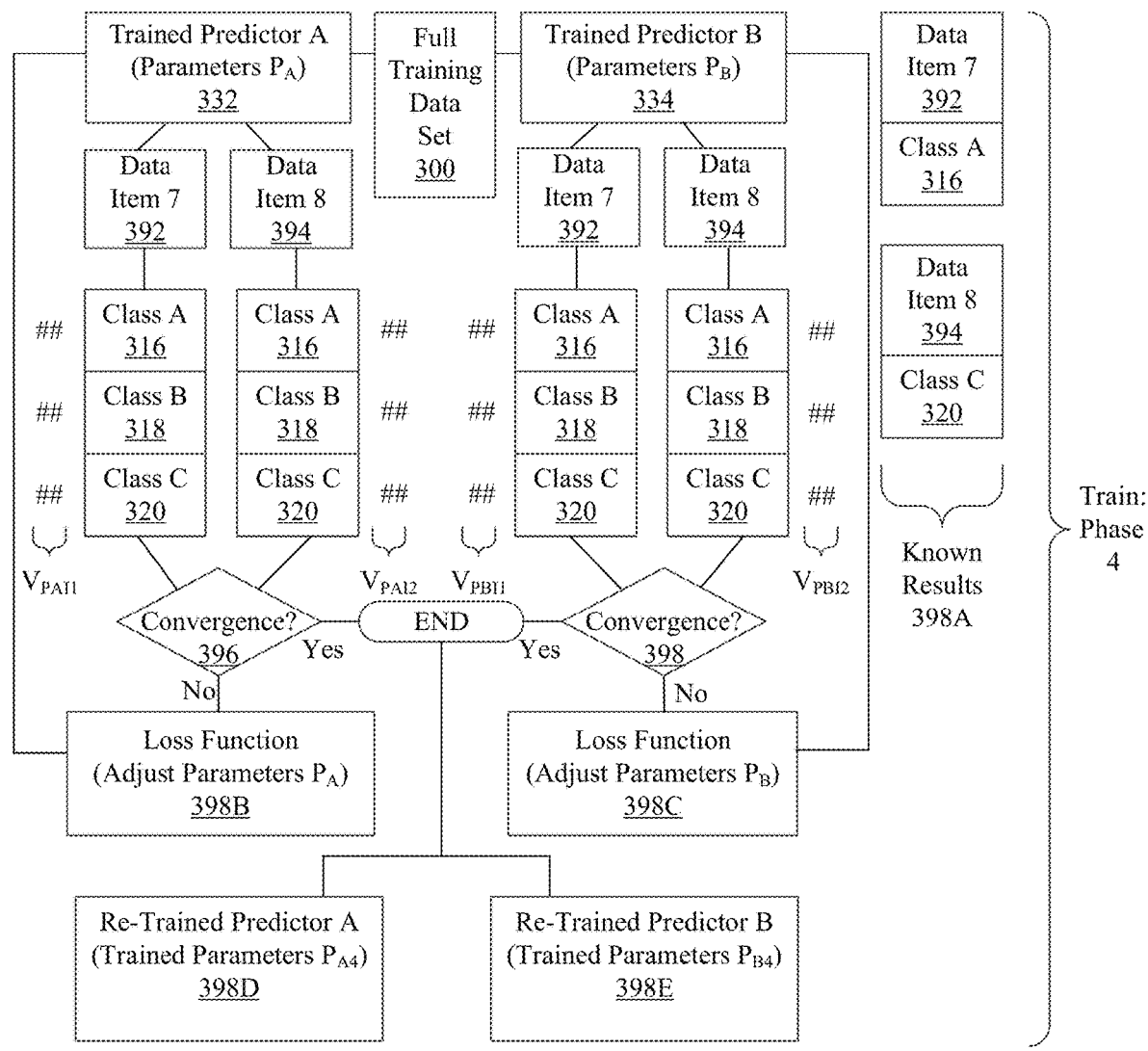

Thus, FIG. 3E shows a fourth phase of MLM training, in accordance with one or more embodiments of the invention. The fourth phase re-trains the trained predictor MLMs on the full training data set (300), which includes all three of the first data set (302), the second data set (304), and the third data set (306), as well as possible additional training data for which the classifications of data items in the full training data set (300) is known.

Thus, for example, the trained predictor A (332) and the trained predictor B (334) receive, as input, the full training data set (300). The trained predictor A (332) predicts a series of probabilities, using parameters $P_A$, that the data item 7 (392) is in the three available classes: Class A (316), Class B (318), and Class C (320). The trained predictor A (332) performs a similar determination for data item 8 (394) with respect to Class A (316), Class B (318), and Class C (320). In addition, the trained predictor B (334) makes similar determinations with respect to data item 7 (392) and data item 8 (394), using different parameters, $P_B$.

Thereafter, for trained predictor A (332), a determination of convergence (396) is made. Similarly, for trained predictor B (334), a determination of convergence (398) is made. Convergence occurs when a threshold degree of match occurs between the classes having the highest predicted probabilities for each data item match the known results (398A).

If convergence does not occur, then loss functions are determined. Each loss function changes the parameters of the corresponding trained predictor MLM in an attempt to increase the degree of match described above. Thus, the loss function (398B) adjusts the parameters $P_A$ for the trained predictor A (332). Similarly, the loss function (398C) adjusts the parameters $P_B$ for the trained predictor B (334).

The process then iterates, using the full training data set (300) as inputs to the trained predictor A (332) and the trained predictor B (334). The process continues until convergence occurs at the convergence (396) and the convergence (398).

Upon convergence, the trained predictor A (332) and the trained predictor B (334) are considered re-trained. The end results is the re-trained predictor A (398D), having re-trained parameters $P_{A4}$ at the end of phase 4, and the re-trained predictor B (398E), having re-trained parameters $P_{B4}$ at the end of phase 4. The re-trained predictor MLMs, re-trained predictor A (398D) and re-trained predictor B (398E) are ready for deployment.

Figure 3F:
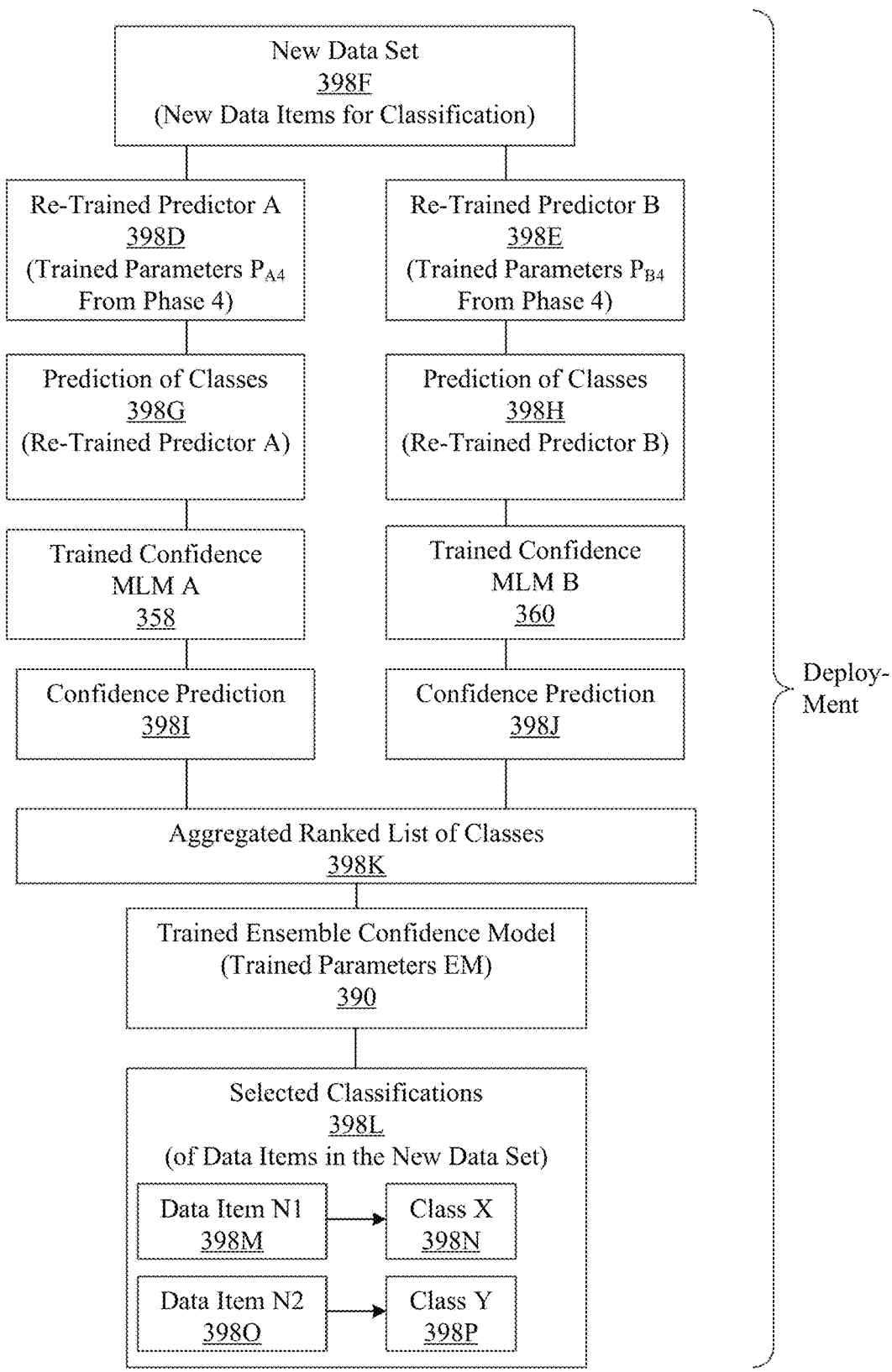

FIG. 3F shows a deployment phase of MLMs trained during the four phases described in FIG. 3B through FIG. 3E, in accordance with one or more embodiments of the invention. The deployment phase takes place after the training phases described with respect to FIG. 3B through FIG. 3D (and possibly also FIG. 3F) have been performed.

During deployment, a new data set (398F) is provided for classification, such as by delivery via an API to a classification engine of an enterprise system. The new data set (398F) includes multiple data items that are to be classified into multiple classes.

The new data set (398F) is provided as input to the re-trained predictor A (398D) and the re-trained predictor B (398E). The re-trained predictors produce, as output, a prediction of classes (398G) by re-trained predictor A (398D) and a prediction of classes (398H) by re-trained predictor B (398E). Each prediction of classes is a series of numbers reflecting probabilities that a given data item corresponds to a given class, as described with respect to training in FIG. 3B through FIG. 3E.

The prediction of classes (398G) and the prediction of classes (398H) are then provided as input to the trained confidence MLM A (358) and the trained confidence MLM B (360). As output, the confidence MLMs determine corresponding confidence predictions that the results of the re-trained predictor MLMs were correct. Thus, the output of the trained confidence MLM A (358) is a confidence prediction (398I) that the re-trained predictor A (398D) was correct. Likewise, the output of the trained confidence MLM B (360) is a confidence prediction (398J) that the re-trained predictor B (398E) was correct.

The predicted probabilities for the classes, as determined by the re-trained predictor MLMs, are combined with the predicted probabilities of correctness, as determined by the confidence MLMs, to determine an aggregated ranked list of classes (398K). Specifically, the aggregated ranked list of classes (398K) are determined in a similar manner as the aggregated ranked list of classes (378) described with respect to FIG. 3D. Briefly, each class is assigned a rank based on a sum of values, with the values being predicted classes multiplied by the predicted confidences.

The aggregated ranked list of classes (398K) is used as input into the trained EC-MLM (390). The output of the trained EC-MLM (390) is the selected classifications (398L) for the new data set (398F). Again, the selected classification for a given data item is the classification having the highest predicted value for the given data item from among all predicted classes by the trained EC-MLM (390). For example, the trained EC-MLM (390) may predict that data item N1 (398M) is 90% likely to be properly assigned to class X (398N) and 10% likely to be assigned to class Y (398P). Because class X (398N) has the highest probability of being the correctly assigned class to data item N1 (398M), the class X (398N) is selected as being the classification assigned to data item N1 (398M). A similar procedure is used to determine that the data item N2 (398O) has a selected classification of class Y (398P). Thus, the final result of deployment of the EC-MLM, together with the predictor MLMs and the confidence MLMs, is a selection of classifications for the data items.

The machine learning training and use procedures described herein represent a technical advancement in the use of machine learning to classify data items. The one or more embodiments more accurately classify data items than simply using a single, or even many, MLMs to predict a selected class. In an embodiment, the MLM structure, including the EC-MLM, were programmed and tested on real enterprise system data. As shown in FIG. 4 through FIG. 11, the resulting classifications performed according to the one or more embodiments were quantifiably and significantly better than classifications using other types and combinations of MLMs.

Note that the procedure described above with respect to FIG. 3A through FIG. 3F may be extended for as many trained predictor MLMs, confidence MLMs, data items, and classifications as are available for a given application. Thus, in a real enterprise system, there may be many predictor MLMs, many confidence MLMs, many different data items, and many different potential classifications. However, only one EC-MLM will be present, trained and used as described above.

Attention is now turned to an example experiment that applies the one or more embodiments described with respect to FIG. 1 through FIG. 3F in a real enterprise system. In particular, the example relates to the classification of electronic transactions. The resulting classifications are used to perform further processing in financial management software. Thus, in the example, the correct classification of electronic transactions (data items) is deemed to be important. Again, the examples of FIG. 4 through FIG. 11 demonstrate the quantifiable improvements of the one or more embodiments with respect to machine learning classification.

Figure 4:
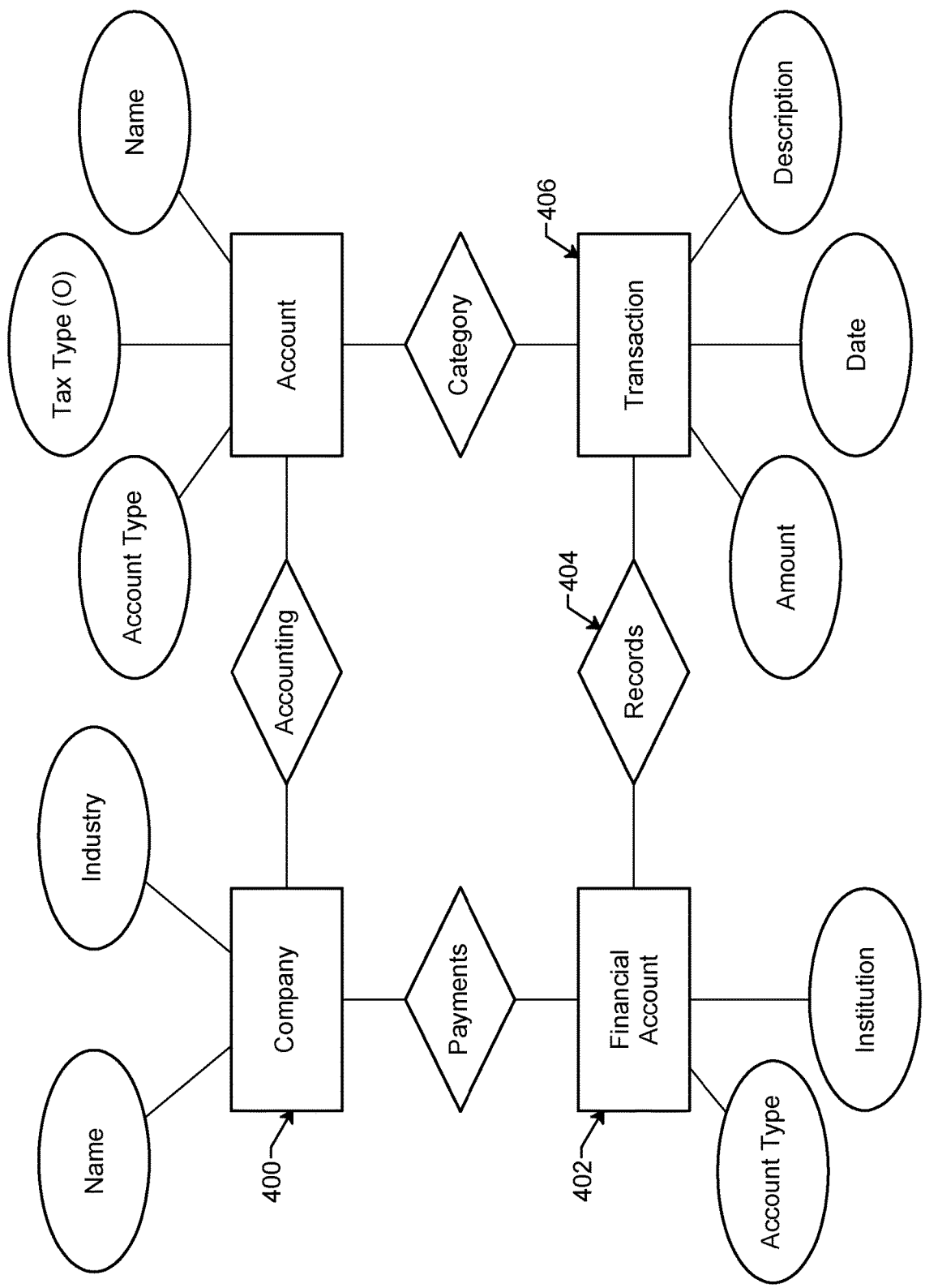
FIG. 4 shows an accounting of payments which describes a classification task, in accordance with one or more embodiments of the invention.

Prior to addressing FIG. 4, additional context is provided for the specific example in electronic transaction classification. A part of financial accounting software involves organizing business transactions using a customizable filing system accountants call a Chart of Accounts (CoA). This task is carried out for every financial transaction, and hence automation is of significant value to the users of accounting software. The automated system uses machine learning to combine fragments of information from millions of users in a manner that allows accurately recommended CoA categories, even when users have created custom categories or named categories using abbreviations and/or in foreign languages. Transactions are handled even if a given user has never categorized a similar transaction. The development and testing of the system at scale over billions of transactions is a non-trivial endeavor.

One or more embodiments are directed to a classification problem where: (1) classes cannot be represented by nominal attributes only, (2) classes have user-specific scope, (3) classes are evolving in the very process where classification is used by a large community of users, and (4) the domain of the most important features are nominal sets having tens or hundreds of thousand elements.

Accounting Automation with Personalized Classification of Financial Transactions Financial accounting organizes business transactions using a customizable filing system accountants call a Chart of Accounts (CoA). To keep business books organized every transaction is filed using the CoA, even small purchases and payments so this is a tedious chore for millions of accounting software users. Assuming classification takes about 3 seconds for a typical financial transaction, a full-scale enterprise environment could have spent over a thousand man years on the classification tasks, if not for the assistance provided by automation.

Assigning correct categories to financial transactions is important because errors can lead to incorrect financial statements, increased audit risk, tax and other regulatory penalties, misinformed financial decisions and displeased creditors and investors. For these reasons accurate financial transaction filing is of significant economic value for everyone involved: business owners, accountants, vendors of accounting software, etc.

Presented is a large-scale recommendation system used by millions of small businesses in the United States, United Kingdom, Australia, Canada, India and France to organize billions of financial transactions each year. The system uses machine learning to combine fragments of information from millions of users in a manner that allows us to accurately recommend CoA categories even when users have created custom categories and/or named categories using abbreviations or in foreign languages and transactions are handled even if a given user has never categorized a transaction like that before.

A simplified model of accounting of payments is shown in FIG. 4. Each company (400) uses one or more financial institutions which offer financial accounts (402) that facilitate transactions such as receiving money from customers, paying wages to employees, paying bills to suppliers, and service providers. The records (404) of financial accounts (402) can be electronically downloaded and each financial transaction (406) is given an accounting interpretation using a Chart of Accounts (CoA) which is a customizable collection of accounting categories. The one or more embodiments provides for a system that learns to recommend the most suitable CoA account for each downloaded transaction.

Financial accounts track how much money changed hands on a given date with a certain counterparty. However, unlike an invoice or a receipt, the transaction records from a financial account typically do not have information about the items purchased or the services involved. Financial transaction records generally only include: a transaction description (which may refer to one counterparty), a financial institution that recorded the transaction, a financial account description, a date of the transaction, and a money amount.

Knowing the counterparty merchant, vendor, or service provider can help assign a transaction to the correct an assigned CoA category. However, knowing a classification may not be possible just from transaction descriptions provided by users' financial institutions. At best, one is able to infer whether two transactions refer to the same counterparty in the transactions' descriptions, through a form of probabilistic co-reference resolution. The real-world attributes of the counterparty include the name, description, business domain, and the like, all of which can be helpful for inferring the meaning of the transaction in the accounting domain, but are not necessary to build the system.

The main transaction attribute, the transaction description, is categorical, nominal with cardinality in the order of 108. There are about 107 distinct counterparties, with an extra order of magnitude coming from the imperfect co-reference resolution. For example, a typical approach to represent nominal values is one-hot encoding. Each nominal value from a set of n values is represented as an orthonormal vector in n-dimensional space. Instead of a single categorical feature, there are have n features, only one of which has value of 1 and the rest are zeros. Thus, just representing the transactions counterparty would require hundreds of thousands features.

To facilitate business insights from accounting reports, small business accounting systems enable companies to customize CoA categories. In practice, semantic information about the CoA of any given company is either unreliable or unavailable. For example, CoA account attributes such as the Type (indicating whether the account represents income, expenses, cost of goods sold, fixed assets, etc.) or Tax Type (for example using IRS Schedule C) are only reliable if the small business uses reports and analysis that depend on the correct setup of these attributes.

Many small businesses treat a CoA as a set of folders for organizing related transactions and the CoA account name is the only attribute that is important for them. Across different companies the same account names may have different meanings and different account names may have the same or similar meanings.

Furthermore, companies organize transactions using different levels of granularity. Transactions pertaining to internet service, cellular phones, water and gas services may (1) all be filed in the same 'Utilities' CoA account or (2) tracked using individual vendor accounts such as 'Company Name 1, 'Company Name 2', etc., or (3) tracked as 'Communication Services' vs 'Water Service' vs 'Heating Service'. As a result, much like counterparty identities, accounting categories are best thought of as nominal attributes unique for a particular company. Instead of a finite, moderately sized set of classes with no structure, there is a complex, large set of objects.

Baseline for Automation

The automation of transaction categorization can be thought of as learning a ranking function $\gamma(u, a, c)=r\in\Re$ that maps possible combinations of User or Company, Account, and Transaction, represented by respective attributes (see FIG. 4) to a real number r, such that $$\forall r_i, r_j: r_i=\gamma(u, a_i, c)$$

$$r_i > r_j \Leftrightarrow P(a_i|u,c) > P(a_j|u,c) \quad (1)$$

There are special challenges for applying common solutions to standard classification problem to this domain. One challenge is that low cardinality categorical attributes associated with companies, accounts and transactions such as Industry, Tax Type, Account Type, etc. have low predictive power with respect to transaction to account assignment. A second challenge is low dimensional representation of textual attributes such as Account Name, Transaction Description, Company Name etc., perform worse on the categorization task than simple memorization of nominal associations. A third challenge is that nominal representations of textual attributes have extremely high cardinality (tens or hundreds of millions).

Historic data may be represented as a set of tuples $\Gamma=(u, a, c, t)\in U\times A\times C\times(t_0, now)$, where u, a, c, t stand for the identities (references, nominal attributes) of the users/companies, accounting categories, transaction counterparties and the time of the event respectively. U, A, C are the respective domains of identities for user, accounting categories and transactions counterparties, and (t0; now) is the time interval. The task is to learn a function $\gamma: U\times A\times C \mapsto \mathbb{R}$.

Notice that even this interpretation of the domain violates the assumptions of standard classification tasks. For example, the number of classes is not fixed, as users can and do define new accounting categories. The number of accounting categories actively used during one year by an entire community of users may be on the order of $10^{\hat{}}108$.

Because accounting categories of different companies are represented by distinct nominal attributes and, therefore, historic data is a collection of associations between distinct nominal values, one possibility is memorizing such associations between accounting categories and counterparties created by the user in the past using a ranking function that satisfies the requirements of equation (1). One such function uses the most popular category that user has assigned to a given counterparty in the past $\gamma_p(u, a, c)=|\Gamma \cap (u, a, c;)|$. Another such ranking function uses the timestamp of the last occurrence of the tuple (u, a, c) as the value of the ranking function $\gamma_t(u, a, c)=\max(t: (u, a, c, t)\in\Gamma)$.

While either of these functions can predict accounting categories for counterparties present in the user's transaction history, no predictions can be made for transactions with new counterparties that constitute about 50% of all transactions. So, even if future transactions with the same counterparty are always categorized correctly and new counterparty transactions are assigned to the most popular account, the mean accuracy of such a classifier would be at most around 50%, starting at close to 0% for new users and slowly growing as the user accumulates a personal history of classified transactions. Learning such explicit mappings from the counterparty to the most likely accounting category independently for every user has been and continues to be the state of the practice today among many vendors of accounting software.

Domain Graph for Coding Nominal Features

One may observe that counting the instances of transactions with a given counterparty in user's accounting categories and selecting the category with the maximum count (as specified by $\gamma_p$) is an approximation of maximum likelihood with the assumption that all categories are equally probable for a transaction with an unknown counterparty. The counts can be thought of as estimates of quantities proportional to conditional probabilities of the counterparty given the user's account. The one or more embodiments extend this procedure to counterparties with which the user has had no prior transactions.

Rather than interpreting the available data propositionally, when each tuple (u, a, c, t) is an independent fact, the data is interpreted as representing a graph of relationships between the users, accounting categories and counterparties. Since identity of accounting categories can be unambiguously mapped to the identity of the user, focus is upon on relational representation of accounting categories and counterparties. Assume that relationships between accounting CoA categories and counterparties are represented in the data by similarity of attributes and associations. The assumption induces the following set of relationships: similarly named CoA categories; CoA categories with matching Tax or Account Types; CoA categories with the same counterparties; counterparties assigned to the same CoA category; and counterparties assigned to related CoA categories.

For transactions with counterparties that a given user has categorized in the past, the strategies of using the most popular or the most recent category, for example, perform quite well. These strategies represent the nominal counterparty attribute using a consistent scoring procedure over the set of accounts to be ranked such that the scoring procedure preserves partial order of these accounts with respect to conditional probability of the account given the counterparty. This coding of nominal attributes is often called target coding as the coding substitutes nominal attribute with an estimate proportional to the probability of observing the nominal attribute associated with the target class.

While direct observations only provide information about associations of a specific counterparty with a specific accounting category of a given user, using the relational graph, other kinds of associations can be encompassed similarly. In relational interpretation each user account is represented by a graph induced by the relationships to counterparties and other accounts induced by account's attributes and associations with transaction counterparties. Thus each counterparty can be represented by a vector of scores. Each score is proportional to the conditional probability of the counterparty being associated with other accounts related to the given account by the value of the attribute or the direct associations of the score with other counterparties.

When a user has a transaction with a new counterparty, this counterparty can be represented by the strength of association with the set of accounts to be ranked for the classification task as well as by the strength of association with other entities related to the account such as other accounts of the same type, similarly named accounts and the counterparties present in the account. This information can be derived from counterparty occurrence and co-occurrence statistics in the accounting categories of other users. Thus the strength of association between accounts and counterparties derived from the data of the entire population of users is used to estimate, for example, the strength of association between a new counterparty and user's accounting categories.

For example, an account's type attribute relates a given accounting category to all other accounts of the same type. The fraction of transactions with a given counterparty that is associated with the accounts of the same type can serve as an estimate for a score that satisfies the requirements of the ranking function of equation (1).

Account Name is another attribute that can be used to relate accounting categories. Unlike the low cardinality attribute such as Account Type, the Account Names have cardinality in the order of 105 and only about half are shared between any two users. Rather than equality of Account Names, one can use some form similarity measure to define the similarity-by-name relationship for accounting categories. Once such a relationship is defined the process of scoring the counterparties by the strength of association with every accounting category can be the same, as in other cases.

Figure 5:
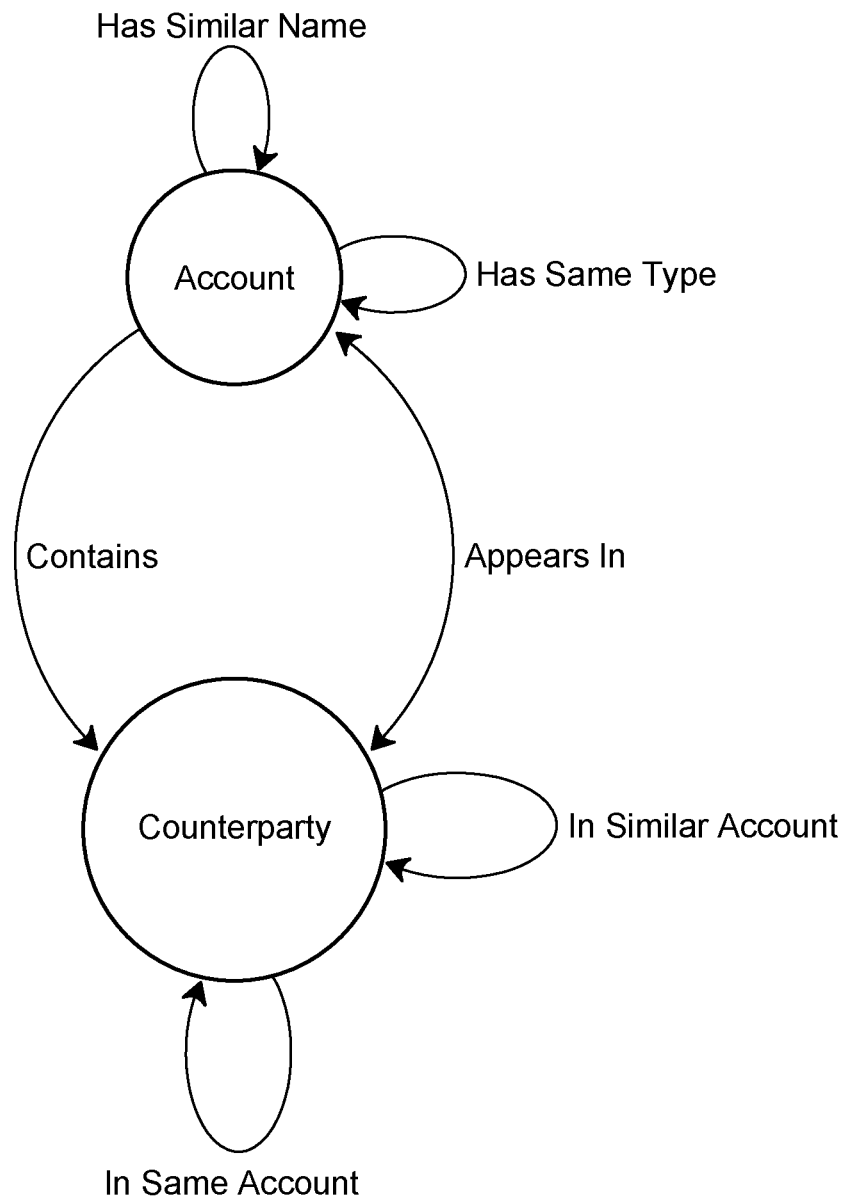
FIG. 5 shows a relational model of historic data, in accordance with one or more embodiments of the invention.

Finally, accounting categories become related by virtue of being associated with the same counterparty. One can think of this type of association as a second order association. If pairs of counterparties can be scored proportionally to the probability of counterparty co-occurrence in the same account, such scores can be used to score accounting categories with respect to the probability of association with a new counterparty based on the current association of the accounting category with other counterparties. The types of relationships that exist in the domain model are shown in FIG. 5.

Event Counts for Association Strength Scoring

Using event counts over sets of observations, representing categories, to estimate the probability of the event given the category can be effective when the number of observations is large, and the events of interest are well distributed over the categories. When dealing with events defined by high cardinality nominal attributes, as is the case in at-scale enterprise systems, rare events should be accounted-for. When counting counterparty distribution over accounts or counterparty distribution over accounts defined by type or name similarity, a fixed number of events can be added to every category. This procedure is known as additive smoothing, sometimes also called Laplace smoothing.

When prior probability of all categories to be ranked (typically a subset of accounting categories of a given company) can be estimated from data without knowledge of the counterparty of the new transaction, the posterior probability of the accounting category given the counterparty can be estimated as a mixture of two terms: (1) the estimation based on the counts associated with the counterparty and (2) the prior for the category estimated from all training data:

$$P(a \mid c) = \lambda(n_a)\frac{n_a}{n} + (1 - \text{lamda}(n_a))P(a),$$

where $n_a$ is the count of training set transactions with counterparty c and accounting category a and $\lambda(n_a) \in (0,1)$ is a monotonic function that increases from zero for $n_a$ and approaches 1 as $n_a$ increases.

Similar issues have to be addressed when scoring accounting categories on second order relationships such as for example counterparty to counterparty associations. Intuitively the counterparty to counterparty association should be related to the likelihood that counterparty $c_i$ appears in the same accounting category a, as the counterparty $c_j$ given that the user has transactions with both counterparties. This can be estimated by counterparty co-occurrence statistics.

Situations when the two counterparties have very different frequencies of occurrence ($\text{Count}(c_i) \gg \text{Count}(c_j)$) should be addressed, as well as situations when one of the counterparties is rare. The first situation can be addressed by using a mean of fractions of cases when counterparty $c_i$ is present in the accounting category given that the counterparty $c_j$ is present in the accounting category plus the inverse as in 0.5 $(P(c_i \in a \mid c_j \in a) + P(c_j \in a \mid c_i \in a))$.

On the other hand, association strength will be grossly overestimated for rare counterparties that happen to cooccur once or twice. This problem has been observed using Pointwise Mutual Information for estimating the strength of lexical association. The issue may be addressed by adding a factor that scales down the estimation when one of the counts is comparable to k, and approaches 1 when both counts are large compared to k, which is a small integer.

Combining Weak Ranking Predictors

Note that coding counterparty representation by scoring association strength with each accounting category along multiple dimensions of association derived by a walk on the domain graph produces multidimensional representation of the counterparty such that scores along each dimension satisfy the requirements of the ranking function of equation (1), and thus can be used directly and independently as three weak ranking predictors:

1. Scores derived from direct associations between counterparties and accounting categories can be used to rank user's accounts when classifying a transaction with a counterparty known to the user.

2. Transactions with counterparties not known to the user can be classified by ranking user's accounting categories based on the strength of association between the counterparty and the counterparties directly associated with user's accounts.

3. Transactions of users who have not classified any transactions before can be classified using scores derived from association strength between transaction counterparty and accounting categories of other users related by attribute equality or similarity to the user's accounting categories. The above-described approach has several issues:

1. The performance of the ensemble may be bounded by the performance of the individual base predictor applied. The combined power of all the available predictors may not be used.

2. It is unclear how to integrate predictors that have the same applicability conditions like, for example, multiple predictors derived by scoring a counterparty along different dimensions of account to account association.

To address these issues, the one or more embodiments combine multiple ranking predictors, where each predictor trains independently in parallel which is used for scaling the solution to millions of users, hundreds of millions of accounting categories, and tens of millions of unique counterparties.

Confidence Based Ensemble of Association Strength Rankers (CEASR)

The core idea, also described above with respect to FIG. 1 through FIG. 3F, is for each base classifier to also train a separate model, called a confidence model, to estimate the probability that the top-ranked category recommended by the base classifier for the specific item being classified is correct. Such a confidence model can be trained using representation of the item in some feature space using historical data for correct item class.

Since each of the base classifiers is a ranking classifier as defined in equation (1), when classifying a counterparty c for user u, having n user-specific classes (accounting categories) $a_i$: i∈(1 . . . n), each of the base classifiers will produce a set of ranking predictions $r_i$: i∈(1 . . . n). While the highest ranked class is the best answer the base classifier can give to the classification problem, the sequence of top k ranks $r_i$: i∈(1 . . . k) provide a k-feature vector representation that effectively integrates information about the base classifier and the classified item predictive of the likelihood that the class selected by the base classifier is the correct class for the item.

For each base classifier, a confidence model, $\lambda: \mathbb{R} \mapsto \mathbb{R}$, is trained that minimizes the mean squared error (MSE) with respect to base classifier top ranked class $a_{(1)}$ being the correct class for the item. The one or more embodiments then uses the sum of ranking scores produced by each base classifier, scaled by the estimated confidence of the base classifier for the classified transaction. See, for example, FIG. 3C and FIG. 3D.

Experimental Results

Two performance indicators directly impact how much work accounting software users do to organize user financial transactions. The first performance indicator is an accuracy of recommendations. Every inaccurate recommendation has to be manually corrected. The second performance indicator is an accuracy of recommendation confidence. Sorting recommendations by how likely they need corrections makes the review process faster because users can focus user attention on a small fraction of transactions that need attention the most.

Figure 6:
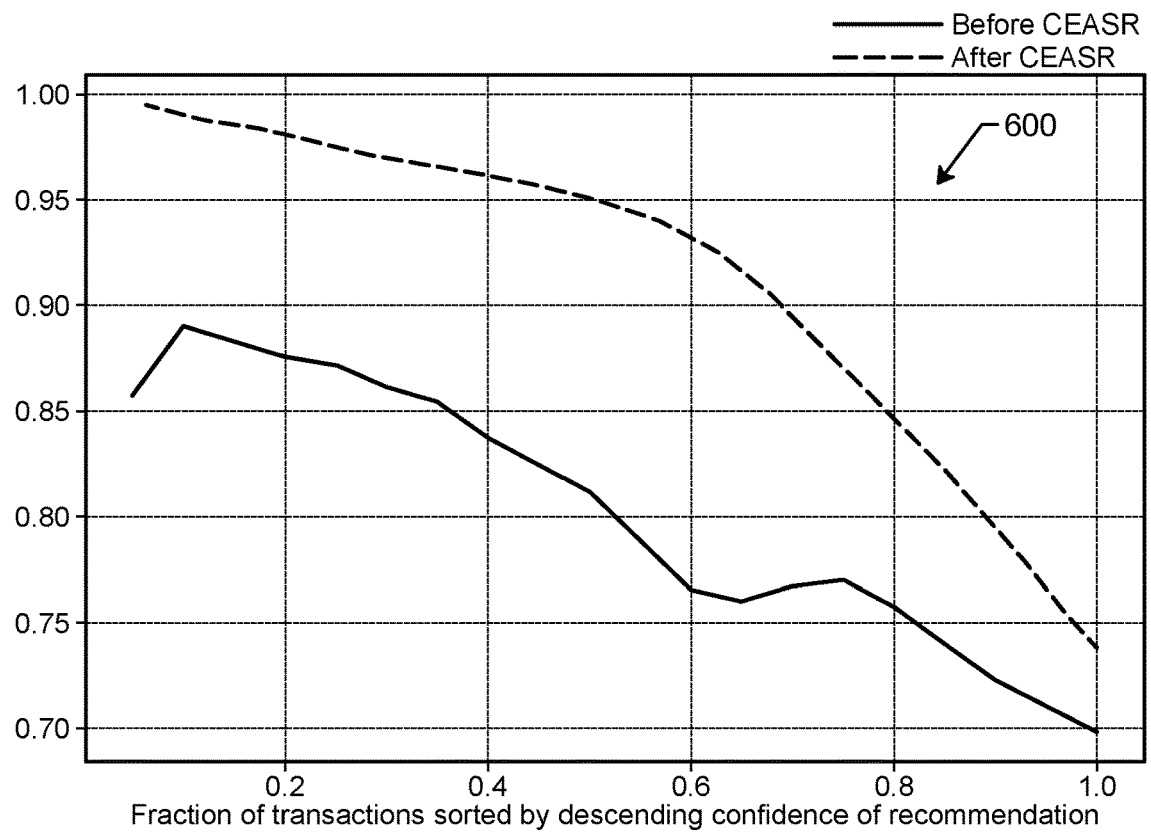
FIG. 6, FIG. 7, FIG. 8, and FIG. 9 show graphs depicting MLM performance, in accordance with one or more embodiments of the invention.
Figure 7:
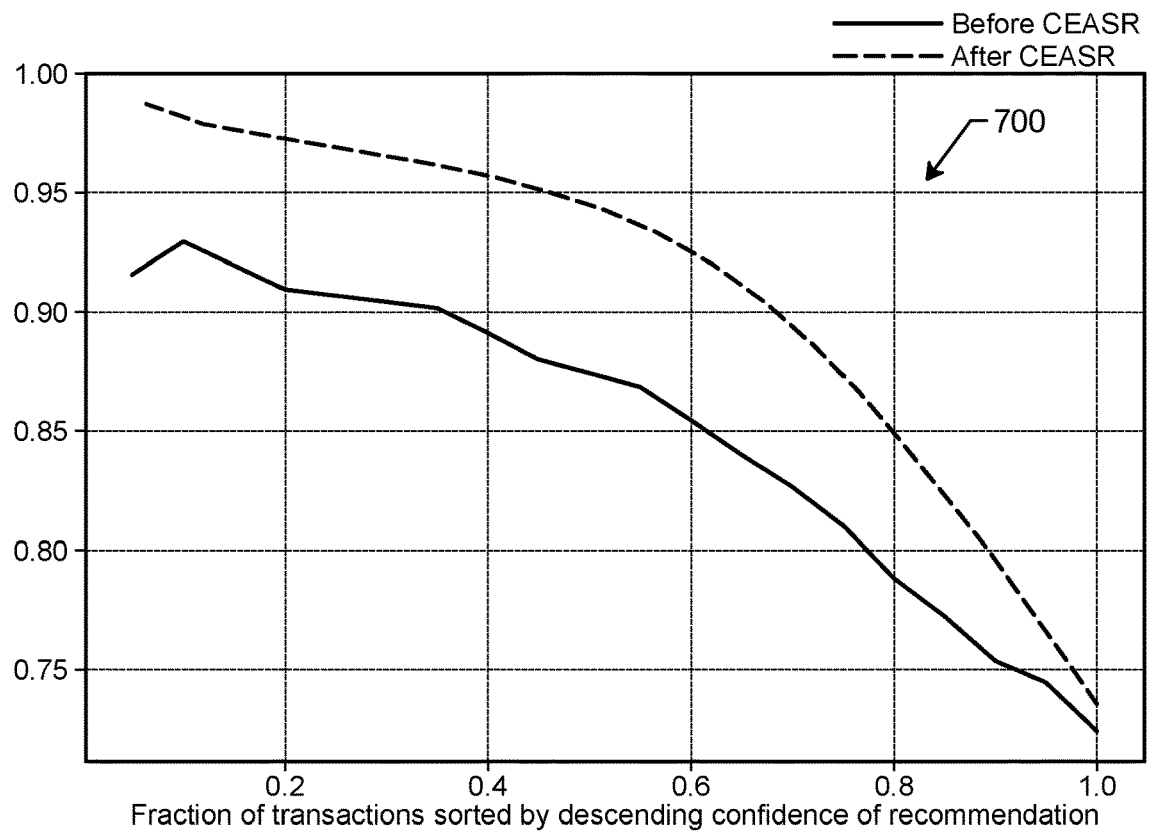
Figure 8:
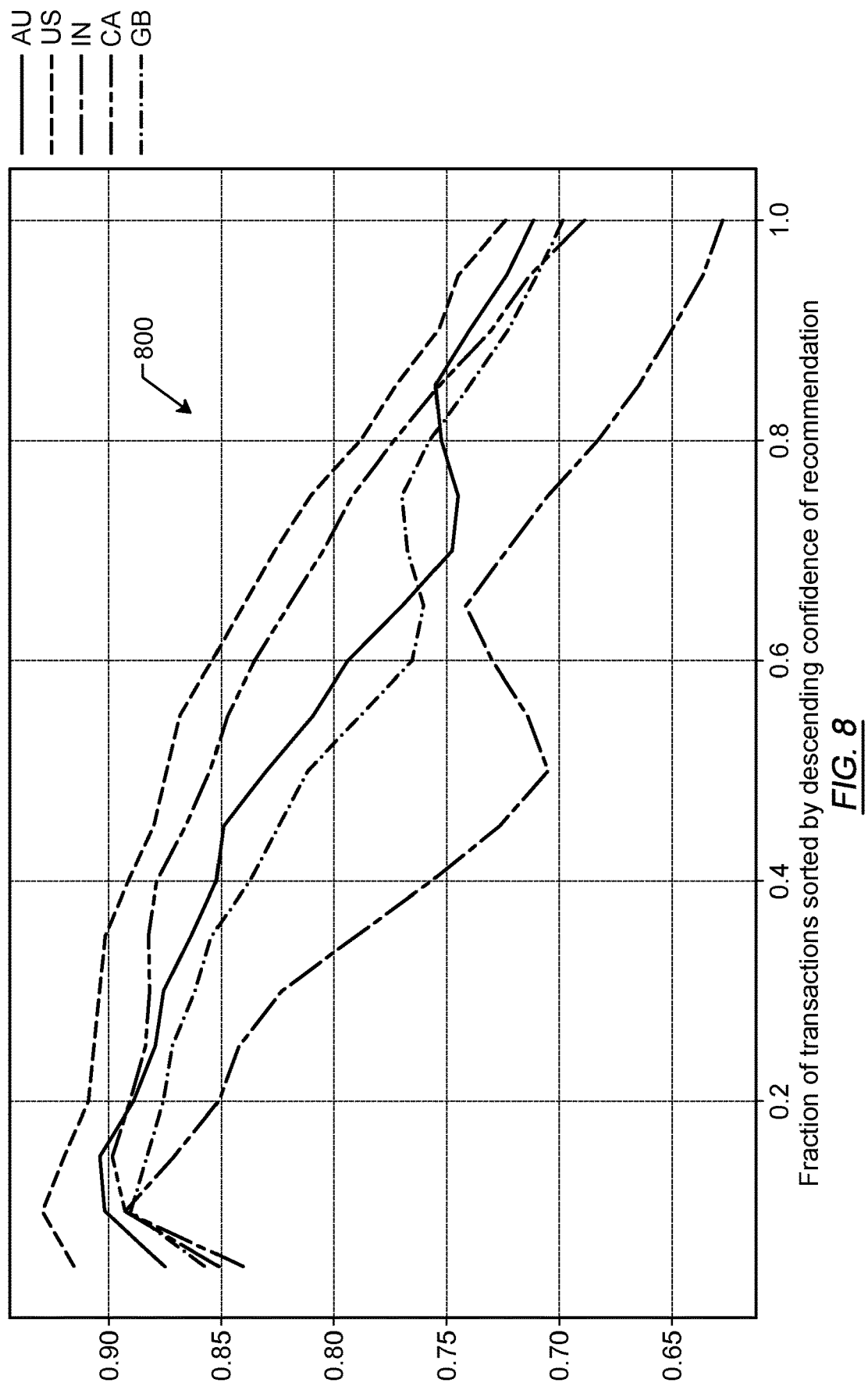
Figure 9:
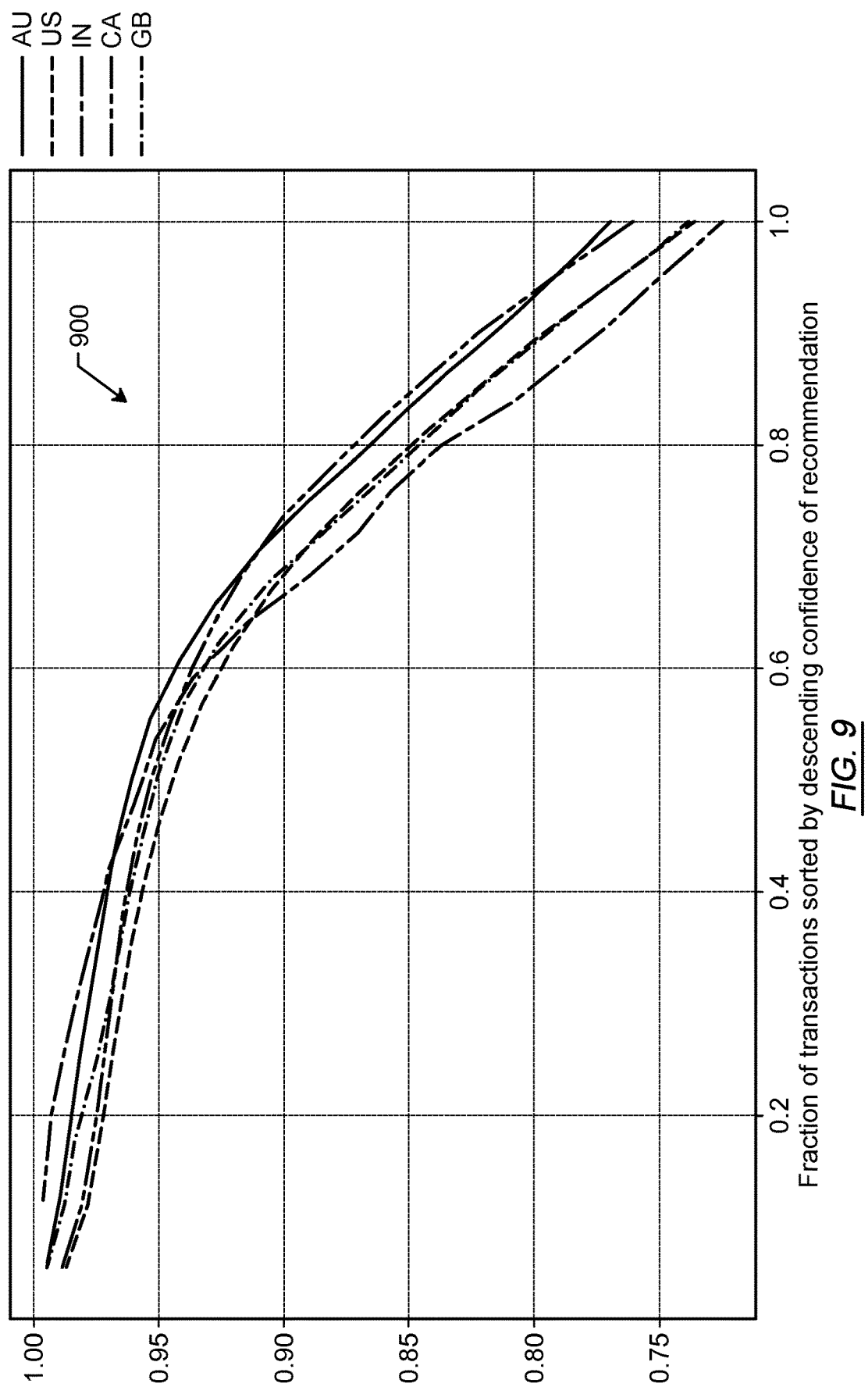

To track these performance indicators a mean accuracy of recommendations is plotted against the fraction of all recommendations when sorted by descending confidence of prediction as shown in graph 600 of FIG. 6, graph 700 FIG. 7, graph 800 FIG. 8, and graph 900 FIG. 9. Comparing FIG. 6 to FIG. 7, in regions with more users and more classified transactions, the performance is better both in terms of absolute accuracy and better in terms of the ability to sort transactions by expected accuracy.

Before CEASR, the mean accuracy of classifications was around 70% in the smaller region and slightly above 70% in the larger region. However, with CEASR, 70% of transactions can be separated with mean accuracy of category recommendations above 90% across different regions. The impact is also more pronounced in smaller user regions with less training data.

From comparing FIG. 6 through FIG. 9 to each other, one can see that CEASR has a number of technological improvements over known classifiers. First, the one or more embodiments significantly improves performance. Second, the one or more embodiments have the greatest overall benefit in smaller regions. Third, the one or more embodiments show consistent performance across all regions.

How the Model is Used

Figure 10:
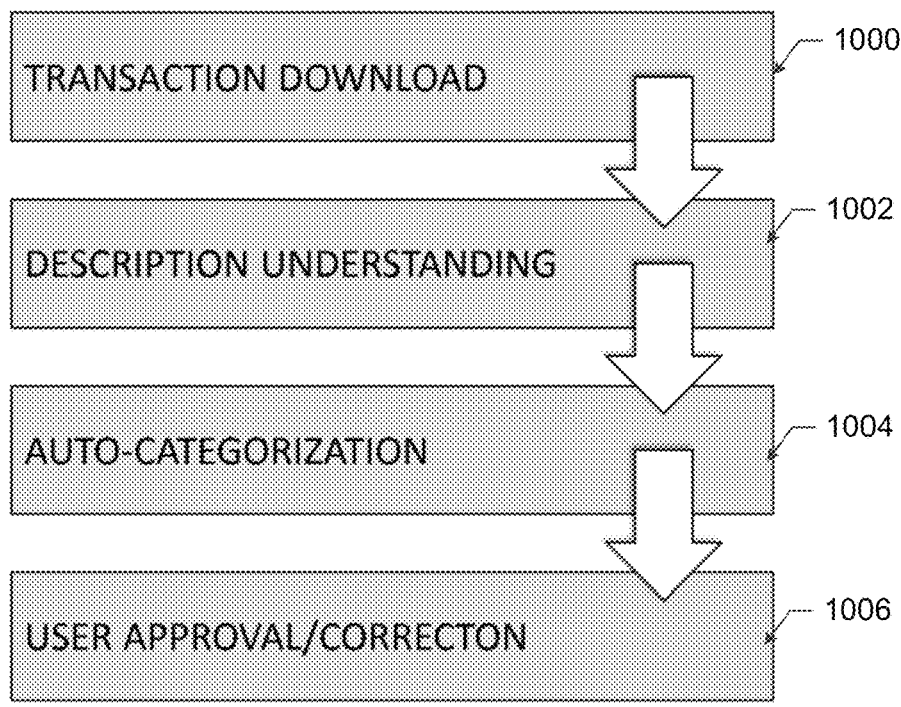
FIG. 10 shows stages of transaction processing in a specific classification example, in accordance with one or more embodiments of the invention.

A financial management application (FMA) may offer users the ability to connect financial accounts (banks, credit unions, investment, etc.) to download transactions. What happens next is illustrated in FIG. 10. Upon download (step 1000), each transaction undergoes analysis (description understanding at step 1002) to understand what the transaction represents (withdrawal/deposit, purchase/income, loan payment or disbursement, money transfer, fee, etc.) and who the transaction is with (the counterparty). Next, at step 1004 (auto-categorization), the account likelihood ranking model is applied and transactions are tentatively filed (auto-categorized) with respect to each user's CoA. In step 1006 (user approval/correction) users get an opportunity to accept and/or correct how transactions have been filed and corrections are used to update the account likelihood ranking model next time the ranking model is built.

How the Model is Built

Figure 11:
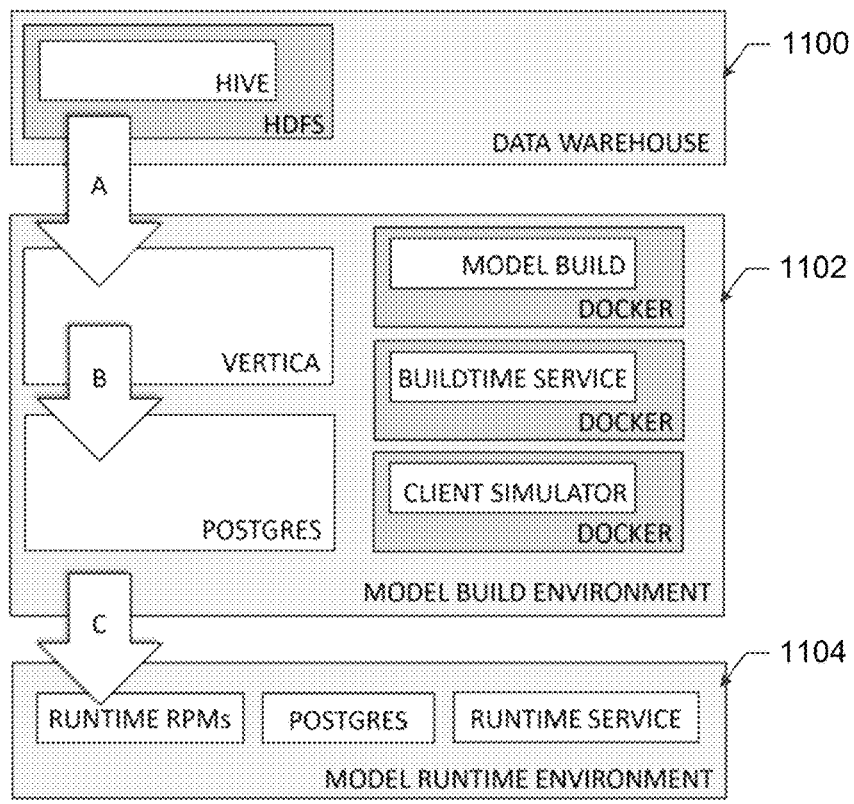
FIG. 11 shows a model build environment, in accordance with one or more embodiments of the invention.

Production models are regularly rebuilt to keep the production models fresh. The rebuilding process has three main steps as shown in FIG. 11. The three main steps are data extraction (step 1100), model building (step 1102), and model acceptance testing (step 1104).

Data Extraction

Model builds start with step 1100: Extraction of just the table columns that pertain to financial account transactions and CoA accounts. From a data warehouse, these columns are transferred to database software (FIG. 11, step A) where additional projections are added so that the model build data access patterns are sequential.

Model Build

The model build at step 1102 (computing the counterparty cooccurrence sparse matrix), from here on also called the coupling table, is carried out in in the database software as controlled by a PYTHON® orchestration service. Once model tables are created, they are transferred from the database software using columns to a database software using rows (FIG. 11 step B). In this step, knowledge representation is switched from column store to row store.

Model Acceptance Testing

After the model data is in a knowledge representation, an instance of the build time model service is started. A model service client simulator is launched for model acceptance testing. The model service client simulator replays a month of transactions. Model coverage and accuracy metrics are tracked, and the model build is halted unless these metrics have acceptable values. On successful test completion, the model is compressed into RPM (red hat package manager) package files for distribution (FIG. 11 Step C).

The final step, step 1104, is to install the RPMs (red hat package managers) on a node having hardware matching what is used in production and to again launch the client simulator to replay transaction history this time however for model latency acceptance testing. Model acceptance testing is split like this for two reasons. First, latency tests are not reliable unless they are performed using OS (operating system) and hardware matching production runtime environment. Second, model coverage and accuracy tests do not use production hardware, so these tests may be launched right away. If there is a model accuracy or coverage drop (due to, for example, a change in some up-stream system) automated tests quickly catch the drop.

Firm Real-Time Deadlines

Some transactions involve counterparties coupled to a small number of other counterparties. These are quick to classify especially when the counterparties involved are popular. Other transactions involve counterparties weakly coupled to hundreds of counterparties or to counterparties which are relatively rare. Such transactions take longer to classify because each extra counterparty requires a new b-tree index search and the more obscure the counterparty, the lower down in the cache hierarchy the coupling table entries for that counterparty are likely to be.

In the production service, popular counterparties are likely cached whereas rare counterparties are unlikely to be cached. For this reason, some transactions can take 100 times longer to categorize and models are latency tuned to operate predictably under firm real time deadlines. Deadlines may be firm because failing to show users transactions on time could be worse than if these transactions are missing account recommendations.

Model Latency Tuning

Latency tuning involves pruning those entries from the model tables which are least likely to influence recommendations. Values that are tiny for example are unlikely to make a difference.

With coupling tables smaller, fewer b-tree search steps are used, and a larger portion of the coupling table b-tree index can be cached so index searches are shorter and faster. However, small coupling tables contain less information and as the coupling table size is reduced model coverage and model accuracy both suffer.

During latency tuning, the trade-off between model latency (due to coupling table size) and model coverage and accuracy may be adjusted. Latency tuning may be used to help prevent models from exceeding firm real-time latency deadlines. If a deadline is missed, account predictions are late they cannot be used. Late predictions, even if correct, are always counted as being incorrect.

Tuning coupling table sizes for latency also requires that the tuning process sends transaction request sequences that are representative of what happens in production. The transaction counterparties are as diverse, and the counterparty order should be representative.

Latency tuning with just a few transaction counterparties is misleading because, after a counterparty is first referenced, the coupling table entries are now high up the cache hierarchy and subsequent references are quick. A similar cache effect occurs even if one uses all possible counterparties, but fail to mix up counterparty order. To avoid both of these problems, models may be tuned using sequences of requests that play back production model usage from history.

Build Versus Runtime Servers

The model used in the one or more embodiments may be regularly refreshed to reflect changes in the real world and comply with regulations such as GDPR. To enable regular and timely model updates, the build process may be performance optimized as well. However, the characteristic patterns of data access during model training are quite different from the interactive context at runtime.

For example, model build servers are selected and optimized for sequential large IO (input/output) throughput. These have RAID (redundant array of inexpensive disks) 10 with small chunks and wide stripes. File systems are created with large records and OS (operating system) scheduler policies are set to favor throughput over latency. Four or more CPU (central processing unit) socket servers with NUMA (non-uniform memory access) work well.

Additionally, model runtime servers are selected and configured to maximize the number of small IO operations per second (IOPS). RAM (random access memory) is maximized and SSDs are used for model data storage. The file system holding the model is created with small records, and OS scheduler policies are set to favor latency over throughput. NUMA is avoided, due to the RAM latency overheads NUMA can impose.

Furthermore, model runtime servers are dedicated for just one task, so no other process competes for TO or cache. Virtual memory and swap either are disabled, or model process memory are locked to prevent being swapped out. This procedure is done so that once a classifier node is running response latencies stay low and predictable.

Knowledge Representation

Knowledge may be represented differently when building models versus when using them. During model builds, knowledge is represented inside a column store database using projections in a denormalized format with the same data stored in various sort orders. Thus, access is sequential, cache friendly, and takes advantage of efficient column-wise compression boosting effective TO throughput.

Model deployment knowledge is represented using tables in a row store database. Here, tables are stored clustered on the primary keys of the tables and additional b-tree indexes are built such that the need to access data beyond what is indexed is rare ("index only scans").

The reason for this difference is twofold. First, during model builds, the data access patterns are known in advance so in-memory and on-disk layouts of data can be optimized for cache hierarchy locality. However, when the model runs in production, it may be unknown which users, accounts and counter-parties will be involved in any incoming request; hence, the knowledge representation may be optimized to answer any request quickly. Second, when the model runs in production, there is a firm real time latency deadline. Requests are handled in milliseconds because users are waiting. Thus, latency concerns dominate over throughput concerns. On the other hand, when a new model is being built users are not waiting, so latency is not a concern and instead throughput concerns dominate because they drive model refresh cost.

Fault Causes, Detection and Recovery

Data extraction from a data warehouse may vulnerable to unexpected changes in how a supporting financial management application represents information. Database schema changes that cleanly break data extraction scripts are straightforward to detect. Harder to detect are shifts in the meaning of the same database schema such as happens when upstream product teams make an effort to minimize database schema changes. In these cases, data extraction scripts may yield incomplete sets of training transactions and other unexpected and undesirable results.

Another source of faults is the data warehouse software. The data warehouse software might not be self-tuning. Thus, as the amount of data grows and the distribution of that data changes, the data warehouse software queries that once ran as expected can take an exorbitant amount of time and/or outright fail. For example, query plans that poorly spread out processing across the cluster can cause too much data to be sent to just a few nodes. With memory exhausted, nodes crash and manual intervention is required to restructure the query.

Tables with billions of rows are created, exported, imported, indexed, etc., during each model build. Thus, operations such as table creation or indexing are split across multiple workers. When exporting or importing tables, the tables may be divided into chunks which are handled in parallel, without chunking large tables limit scalability.

As a consequence, a model build involves many pools of workers, easily adding up to hundreds of workers. While the chance of any one worker encountering problems is small because the work is carried out by so many, one should consider what happens when faults occur. Specifically, when manual intervention is required, a question arises regarding how to bring hundreds of parallel workers to a state from for which fault diagnosis and fault recovery is possible.

The one or more embodiments have each task worker carry out the following steps in the order listed below. First, check that no other worker has reported a fault. If a build halting fault has been reported no worker will start new work. The worker that encounters a build halting fault does not forcibly kill other concurrent workers because this would leave many partially complete tasks needing cleanup; thus, already running tasks may finish gracefully.

Second, check that the assigned task has not already been performed. If a checkpoint has already been committed for this task indicating the check has already been performed, and the check results have been verified, the worker will log this fact. Otherwise, the worker will otherwise do nothing, and the corresponding worker pool will assign to a worker a different task.

Third, check that conditions to start the assigned task are satisfied. A worker that copies table chucks from a column store database to a row store database, for example, checks that: (a) source and target databases are alive, (b) source and target schema exist, and (c) source and target tables exist. If any of these conditions are not satisfied the worker reports the fault and exits.

Fourth, according to the previous three steps: (a) no other worker has reported a fault, (b) the assigned task has not been performed (c), and defined conditions to start the task are satisfied. If all of these conditions are true, a check may be made whether partial results from a previous task attempt exist and if a cleanup is performed. Finally, the assigned task is started.

Fifth, after the task is done, assertion checks are used to verify the task finished correctly. For example, if the task is to build a certain table, when the task is done, a verification is performed that the table exists and that the table contains a reasonable number of rows and other such attributes. A task is considered complete and the task checkpoint is committed if and only if all assertions about the task pass. Otherwise, the worker reports a fault and exits.

The technique described above prevents fault cascades. A badly created table does not, for example, cause other tables to be badly created because the error is caught quickly. This technique also allows fault recovery. Once a fault is cleared, if 90% of a multi-day model build is complete, when the build is restarted, just the remaining 10% of tasks will be attempted due to checkpoints from a previous run.

Model Deployment

The model of the one or more embodiments operates as a service API deployed using a cluster of identical classifier nodes behind a load balancer. Incoming requests first go to the load balancer which then forwards the request to an available classifier node. If the continuous load on the least busy classifier node is too high, additional classifier nodes are added. If the continuous load on the busiest classifier node falls, the oldest classifier node is removed from the load balancer pool and stopped. If a classifier node malfunctions (e.g. timeouts on requests) the load balancer automatically replaces the classifier with a new node, thereby healing the service. This healing functionality is also used for zero downtime upgrades, such as when fresh models are deployed. Old classifier nodes are purposefully killed one at a time and the load balancer replaces them with upgraded versions.

A "shared nothing" may be used architecture because the architecture makes service testing, deployment, and scaling straightforward. For example, when the number of incoming requests doubles, the number of running classifier instances is approximately doubled. When the number of incoming requests drops in half, the number of running classifier nodes is approximately dropped in half. The ratio is approximate because classifier startup takes several minutes. Thus, extra classifiers nodes are always kept around to handle spikes in demand.

User Impact and Benefits

Improvements in the ability to accurately categorize financial transactions are of significant economic value. For a sense of scale, if, without automation, one takes three seconds to select the proper CoA account for a financial transaction, then last year the users of the accounting software of a major enterprise would have spent well over 1,000 man years on the classification task.

CONCLUSIONS

Thus, the one or more embodiments present an improved approach for personalized classification of financial transactions to automate accounting. The improved approach merges the two common supervised machine learning paradigms of classification and recommendation systems into a single framework that (1) can flexibly incorporate propositional and relational representation of the domain, and (2) is efficient for dealing with (a) high cardinality nominal attributes, (b) variable and changing number of classes, and (c) evolving class definitions.

Figure 12A:
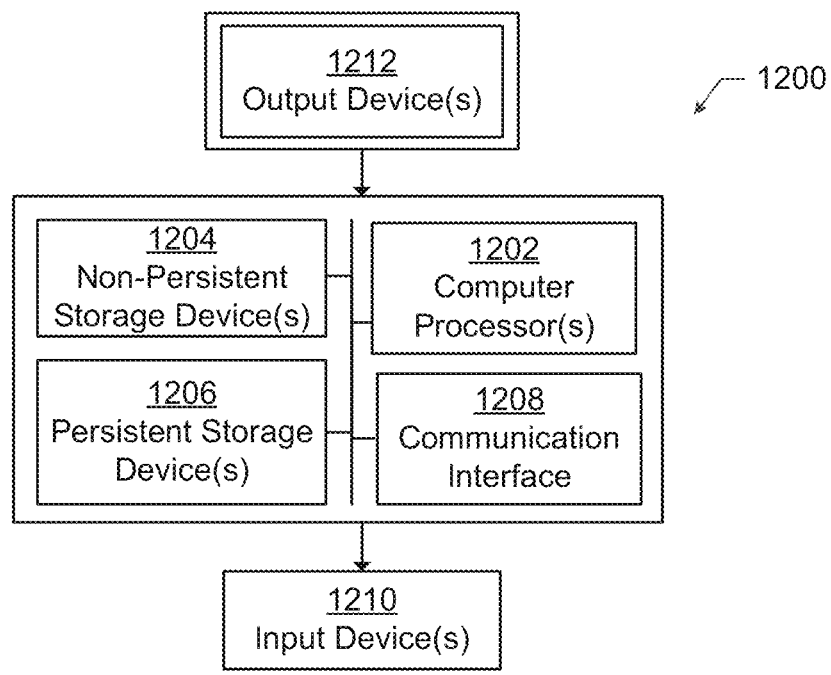
FIG. 12A and FIG. 12B are examples of a computing system and a network, in accordance with one or more embodiments of the invention.
Figure 12B:
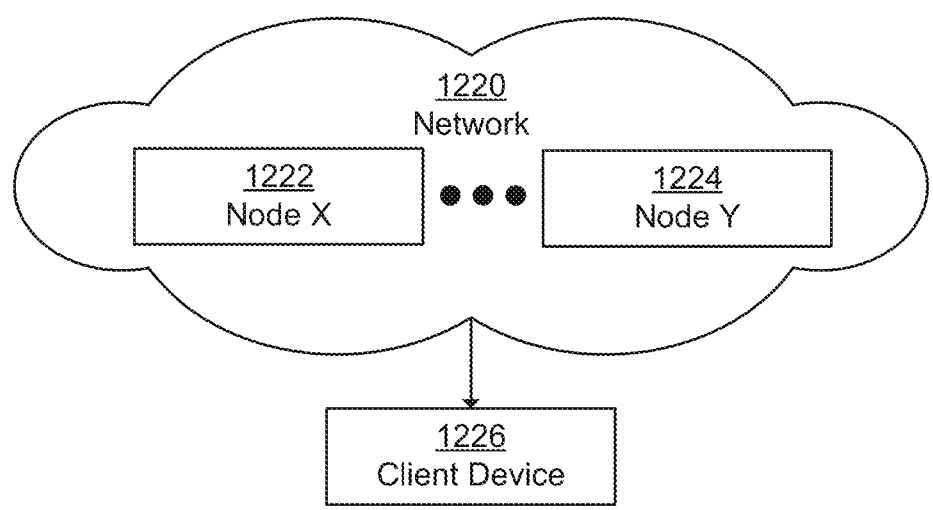

FIG. 12A and FIG. 12B are examples of a computing system and a network, in accordance with one or more embodiments of the invention. Embodiments of the invention may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 12A, the computing system (1200) may include one or more computer processors (1202), non-persistent storage device(s) (1204) (e.g., volatile memory, such as random access memory (RAM), cache memory), persistent storage device(s) (1206) (e.g., a hard disk, an optical drive such as a compact disk (CD) drive or digital versatile disk (DVD) drive, a flash memory, etc.), a communication interface (1208) (e.g., Bluetooth interface, infrared interface, network interface, optical interface, etc.), and numerous other elements and functionalities that implement the features and elements of the disclosure.

The computer processor(s) (1202) may be an integrated circuit for processing instructions. For example, the computer processor(s) may be one or more cores or micro-cores of a processor. The computing system (1200) may also include one or more input devices (1210), such as a touchscreen, keyboard, mouse, microphone, touchpad, electronic pen, or any other type of input device.

The communication interface (1208) may include an integrated circuit for connecting the computing system (1200) to a network (not shown) (e.g., a local area network (LAN), a wide area network (WAN) such as the Internet, mobile network, or any other type of network) and/or to another device, such as another computing device.

Further, the computing system (1200) may include one or more output devices (1212), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (1202), non-persistent storage device(s) (1204), and persistent storage device(s) (1206). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (1200) in FIG. 12A may be connected to or be a part of a network. For example, as shown in FIG. 12B, the network (1220) may include multiple nodes (e.g., node X (1222), node Y (1224)). Each node may correspond to a computing system, such as the computing system shown in FIG. 12A, or a group of nodes combined may correspond to the computing system shown in FIG. 12A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (1200) may be located at a remote location and connected to the other elements over a network.

Although not shown in FIG. 12B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (1222), node Y (1224)) in the network (1220) may be configured to provide services for a client device (1226). For example, the nodes may be part of a cloud computing system. The nodes may include functionality to receive requests from the client device (1226) and transmit responses to the client device (1226). The client device (1226) may be a computing system, such as the computing system shown in FIG. 12A. Further, the client device (1226) may include and/or perform all or a portion of one or more embodiments of the invention.

The computing system or group of computing systems described in FIGS. 12A and 12B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 12A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 12A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 12A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, data containers (database, table, record, column, view, etc.), identifiers, conditions (comparison operators), functions (e.g. join, full join, count, average, etc.), sorts (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 12A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 12A and the nodes and/or client device in FIG. 12B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
   training a plurality of predictor machine learning models (MLMs) using a first data set to generate a plurality of trained predictor MLMs, wherein the plurality of trained predictor MLMs are trained to predict a first plurality of classifications of a first plurality of data items in the first data set;
   training a plurality of confidence MLMs using a second plurality of classifications, output by the plurality of trained predictor MLMs, to generate a plurality of trained confidence MLMs, wherein:
      the second plurality of classifications were predicted by the plurality of trained predictor MLMs operating on a second data set having a second plurality of data items similar to the first plurality of data items in the first data set, and
      the plurality of trained confidence MLMs are trained to predict first confidences comprising a first plurality of probabilities that the second plurality of classifications is correct;
   generating an aggregated ranked list of classes based on a third plurality of classifications output by the plurality of trained predictor MLMs and second confidences output by the plurality of trained confidence MLMs, wherein:
      the third plurality of classifications were predicted by the plurality of trained predictor MLMs operating on a third data set, comprising a training data set, having a third plurality of data items similar to the first plurality of data items in the first data set and the second plurality of data items in the second data set, and
      the second confidences comprise a second plurality of probabilities predicted by the plurality of trained confidence MLMs that the third plurality of classifications is correct; and
   training an ensemble confidence MLM using the aggregated ranked list of classes to generate a trained ensemble confidence MLM, wherein the trained ensemble confidence MLM is trained to predict a corresponding selected classification for each corresponding data item in a training data set containing a second plurality of data items similar to the first plurality of data items.

2. The method of claim 1, further comprising:
   predicting, by the plurality of trained predictor MLMs, the second plurality of classifications for the second plurality of data items in the second data set.

3. The method of claim 2, wherein first outputs of the plurality of trained predictor MLMs comprise a first corresponding plurality of vectors of numbers that indicate a first corresponding plurality of probabilities that the first plurality of data items correspond to the first plurality of classifications.

4. The method of claim 2, further comprising:
   predicting, by the plurality of trained predictor MLMs, the third plurality of classifications for the third plurality of data items in the third data set.

5. The method of claim 4, wherein second outputs of the plurality of trained predictor MLMs comprise a second corresponding plurality of vectors of numbers that indicate a second corresponding plurality of probabilities that the third plurality of data items correspond to the third plurality of classifications.

6. The method of claim 5, further comprising:
   predicting, by the plurality of trained confidence MLMs, the second confidences that the second plurality of classifications is correct.

7. The method of claim 1, further comprising:
   re-training the plurality of trained predictor MLMs using a combination of the first data set, the second data set, and the training data set to form a plurality of re-trained predictor MLMs.

8. The method of claim 7, further comprising:
   deploying, to an enterprise environment, the trained ensemble confidence MLM and the plurality of re-trained predictor MLMs.

9. The method of claim 8, further comprising:
   receiving a new data set comprising a plurality of new data items;
   predicting, using the plurality of re-trained predictor MLMs, a plurality of new classifications for the plurality of new data items;
   predicting, using the plurality of trained confidence MLMs, a plurality of new confidences that the plurality of new classifications is correct;
   generating a new aggregated ranked list of classes using a combination of the plurality of new classifications and the plurality of new confidences; and
   predicting, using the trained ensemble confidence MLM operating on the new aggregated ranked list of classes, a plurality of selected new classifications for the plurality of new data items.

10. The method of claim 1, wherein the plurality of predictor MLMs and the plurality of confidence MLMs are arranged logically in a plurality of pairs.

11. The method of claim 1, further comprising:
   prior to any training step, partitioning a full training data set into the first data set, the second data set, and the third data set.

12. The method of claim 1, wherein training the plurality of predictor MLMs comprises:
   iteratively performing:
      generating an intermediate plurality of classifications for the second plurality of data items;
      comparing the intermediate plurality of classifications to a known plurality of classifications to form a comparison;

generating a loss function based on the comparison; and adjusting, using the loss function, corresponding pluralities of parameters of the plurality of trained predictor MLMs, until convergence on the first plurality of classifications.

13. The method of claim 1, wherein training the plurality of confidence MLMs comprises iteratively performing:

generating an intermediate plurality of probabilities that the first plurality of classifications is correct;

comparing the intermediate plurality of probabilities to a known plurality of classifications to form a comparison;

generating a loss function based on the comparison; and adjusting, using the loss function, corresponding pluralities of parameters of the plurality of trained confidence MLMs, until convergence on the first plurality of probabilities that the second plurality of classifications is correct.

14. The method of claim 1, wherein training the ensemble confidence MLM comprises iteratively performing:

generating an intermediate corresponding selected classification for each of the third plurality of data items;

comparing the intermediate corresponding selected classification to a known plurality of classifications to form a comparison;

generating a loss function based on the comparison; and adjusting, using the loss function, a corresponding plurality of parameters of the ensemble confidence MLM, until convergence on the corresponding selected classification for each of the third plurality of data items.

15. A method of machine learning training, comprising:

training a plurality of predictor machine learning models (MLMs) using a first data set to generate a plurality of trained predictor wherein the plurality of trained predictor MLMs are trained to predict a corresponding first plurality of classifications of a first plurality of data items in the first data set;

predicting, by the plurality of trained predictor MLMs, a second plurality of classifications of a second plurality of data items in a second data set, wherein:

the second plurality of data items in the second data set are similar to the first plurality of data items in the first data set, and first outputs of the plurality of trained predictor MLMs comprise a first corresponding plurality of vectors of numbers that indicate a first corresponding plurality of probabilities that the second plurality of data items correspond to the second plurality of classifications;

training a plurality of confidence MLMs using the first corresponding plurality of vectors to generate a plurality of trained confidence MLMs, wherein the plurality of trained confidence MLMs are trained to predict first confidences represented by a second plurality of probabilities that the second plurality of classifications is correct;

predicting, by the plurality of trained predictor MLMs, a third plurality of classifications of a third plurality of data items in a third data set, wherein:

the third plurality of data items in the third data set is similar to the first plurality of data items in the first data set and the second plurality of data items in the second data set, and second outputs of the plurality of trained predictor MLMs comprise a second corresponding plurality of vectors of numbers that indicate a third corresponding plurality of probabilities that the third plurality of data items correspond to the third plurality of classifications;

predicting, by the plurality of trained confidence MLMs, second confidences that the third plurality of classifications is correct;

generating an aggregated ranked list of classes based on the third plurality of classifications and the second confidences; and training an ensemble confidence MLM using the aggregated ranked list of classes to generate a trained ensemble confidence MLM, wherein the trained ensemble confidence MLM is trained to predict a corresponding selected classification for each corresponding data item in the third data set.

16. The method of claim 15, further comprising:

prior to training the plurality of predictor MLMs, pre-processing a full training data set into the first data set, the second data set, and the third data set, wherein the first data set is larger than a combination of the second data set and the third data set.

17. The method of claim 16, further comprising:

after training the trained ensemble confidence MLM, re-training the plurality of predictor MLMs on the full training data set to form a plurality of re-trained predictor MLMs; and deploying the trained ensemble confidence MLM and the plurality of re-trained predictor MLMs to an enterprise system.

18. The method of claim 17, further comprising:

receiving a new data set comprising a plurality of new data items;

predicting, using the plurality of re-trained predictor MLMs, a plurality of new classifications for the plurality of new data items;

predicting, using the plurality of trained confidence MLMs, a plurality of new confidences that the plurality of new classifications is correct;

generating a new aggregated ranked list of classes using a combination of the plurality of new classifications and the plurality of new confidences; and predicting, using the trained ensemble confidence MLM operating on the new aggregated ranked list of classes, a plurality of selected new classifications for the plurality of new data items.

19. A system comprising:

a data repository storing:

a new data set comprising a plurality of new data items;

a plurality of trained predictor MLMs, wherein the plurality of trained predictor MLMs are trained to predict a corresponding plurality of classifications of a plurality of similar data items similar to the new data items;

a plurality of trained confidence MLMs, wherein the plurality of trained confidence MLMs are trained to predict first confidences comprising a first plurality of probabilities that the corresponding plurality of classifications is correct;

an aggregated ranked list ranking the corresponding plurality of classifications, wherein the aggregated ranked list comprises sums of probabilities of classes predicted by the plurality of trained predictor MLMs weighted by the first confidences predicted by the plurality of confidence MLMs, and wherein weighted is defined as a given probability of a class multiplied by a given probability of correctness;

a trained ensemble confidence MLM trained using the aggregated ranked list, wherein the trained ensemble confidence MLM is trained to predict a corresponding selected classification for each corresponding data item in the plurality of similar data items;

an application programming interface (API) configured to receive the new data set; and a classification engine configured to:
  predict, using the plurality of trained predictor MLMs, a plurality of new classifications for the plurality of new data items;
  predict, using the plurality of trained confidence MLMs, a plurality of new confidences that the plurality of new classifications is correct;
  generate a new aggregated ranked list ranking the plurality of new classifications using a combination of the plurality of new classifications and the plurality of new confidences; and
  predict, using the trained ensemble confidence MLM taking as input the new aggregated ranked list, a plurality of selected classifications for the plurality of new data items.

\* \* \* \* \*